(12) United States Patent
Ishii

(10) Patent No.: US 7,271,956 B2
(45) Date of Patent: Sep. 18, 2007

(54) DIFFRACTIVE OPTICAL ELEMENT

(75) Inventor: Tetsuya Ishii, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/885,592

(22) Filed: Jul. 8, 2004

(65) Prior Publication Data
US 2004/0263982 A1 Dec. 30, 2004

Related U.S. Application Data

(60) Continuation of application No. 09/672,455, filed on Sep. 29, 2000, now Pat. No. 6,781,756, which is a division of application No. 08/697,773, filed on Aug. 29, 1996, now Pat. No. 6,157,488.

(30) Foreign Application Priority Data

| Aug. 29, 1995 | (JP) | ................................. 07-220753 |
| May 31, 1996 | (JP) | ................................. 08-138645 |
| May 31, 1996 | (JP) | ................................. 08-138646 |

(51) Int. Cl.
*G02B 5/18* (2006.01)
*G02B 27/24* (2006.01)

(52) U.S. Cl. ...................... 359/569; 359/576; 359/574; 359/566

(58) Field of Classification Search ................ 359/569, 359/571, 573, 576, 15, 562, 566; 250/226; 378/84
See application file for complete search history.

(56) References Cited

U.S. PATENT DOCUMENTS 3,603,668 A * 9/1971 DeBitetto ................... 359/574
3,980,883 A * 9/1976 Franks ........................ 378/84
4,426,130 A 1/1984 Knop (Continued)

FOREIGN PATENT DOCUMENTS

JP 62269104 11/1987

(Continued)

OTHER PUBLICATIONS

Gary J. Swanson, "Binary Optics Technology: The Theory and Design of Multi-Level Diffractive Optical Elements," Technical Report 854, MIT Lincoln Laboratory, Aug. 1989.

(Continued)

*Primary Examiner*—Audrey Y. Chang
(74) *Attorney, Agent, or Firm*—Stevens, Davis, Miller & Mosher, LLP

(57) ABSTRACT

A diffractive optical element including a stack of first, second and third optical regions or a stack of first, second, third and fourth optical regions, a first relief pattern formed between the first and second optical regions, and a second relief patterns formed between the second and third or between the third and fourth optical regions. The first and second relief patterns have substantially identical pitch distributions and are substantially aligned in a direction of an optical axis. Depths of the first and second relief patterns are set such that a wavelength dependency of diffraction efficiency can be decreased over a wavelength range to be used. It is possible to manufacture in a simple manner at a low cost a diffractive optical element in which undesired flare and ghost are suppressed.

93 Claims, 20 Drawing Sheets

U.S. PATENT DOCUMENTS

| | | | |
|---|---|---|---|
| 4,729,640 A | | 3/1988 | Sakata |
| 5,048,925 A | | 9/1991 | Gerritsen et al. |
| 5,093,749 A | | 3/1992 | Maeda |
| 5,175,647 A | | 12/1992 | Gupta et al. |
| 5,680,231 A | * | 10/1997 | Grinberg et al. ............. 359/15 |
| 5,701,005 A | * | 12/1997 | Meyers ...................... 250/226 |
| 6,157,488 A | | 12/2000 | Ishii |

FOREIGN PATENT DOCUMENTS

| | | |
|---|---|---|
| JP | 62289804 | 12/1987 |
| JP | 243503 | 2/1990 |
| JP | 2239203 | 9/1990 |
| JP | 02296205 | 12/1990 |
| JP | 03052893 | 3/1991 |
| JP | 03213802 | 9/1991 |
| JP | 659218 | 3/1994 |

OTHER PUBLICATIONS

Japanese Office Action dated Jul. 13, 2004.

* cited by examiner

FIG_1
PRIOR ART
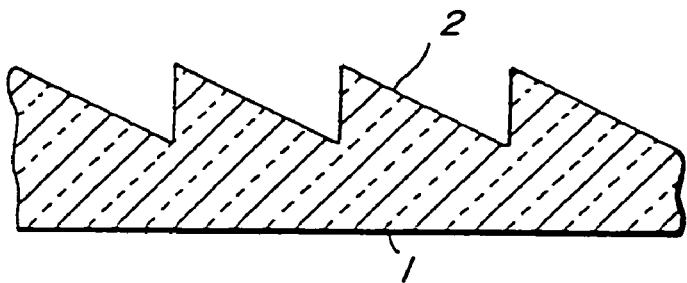
FIG_2
PRIOR ART
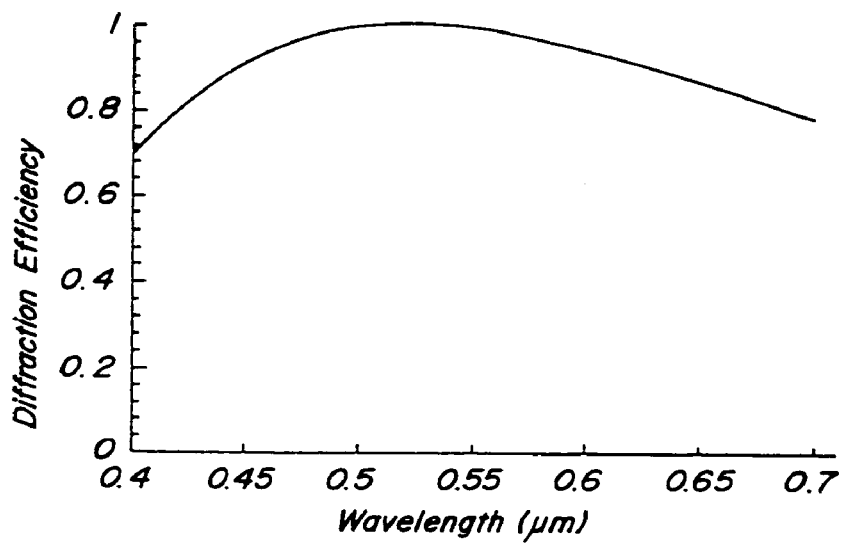
FIG_3
PRIOR ART
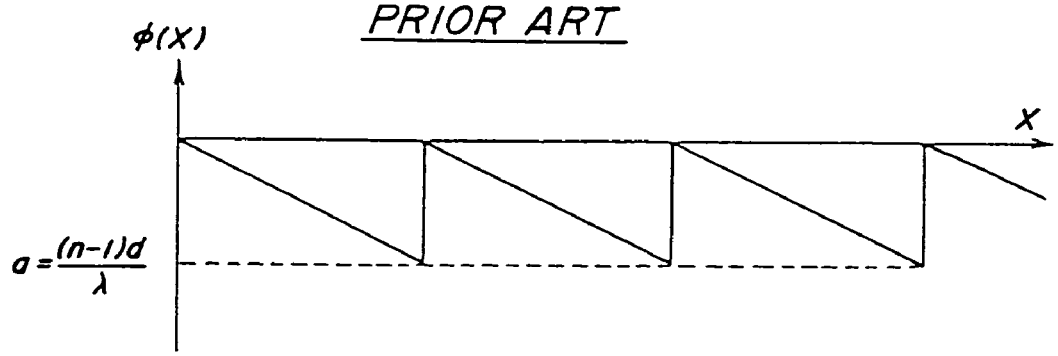

FIG_4
PRIOR ART
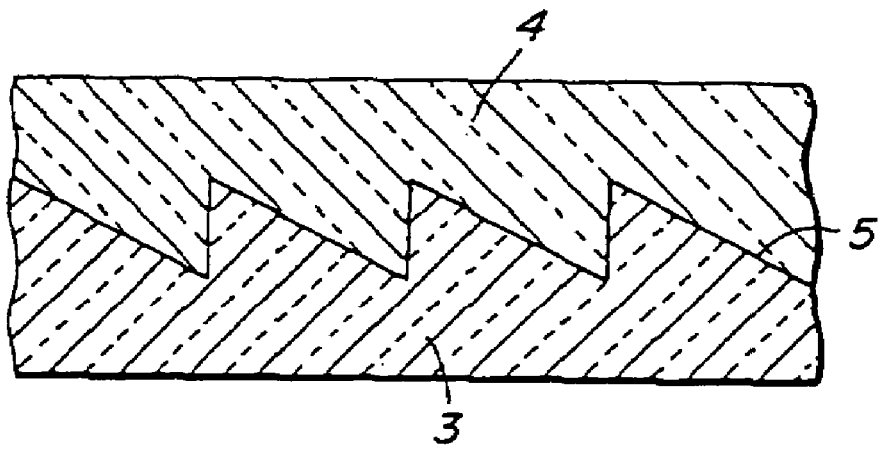
FIG_5
PRIOR ART
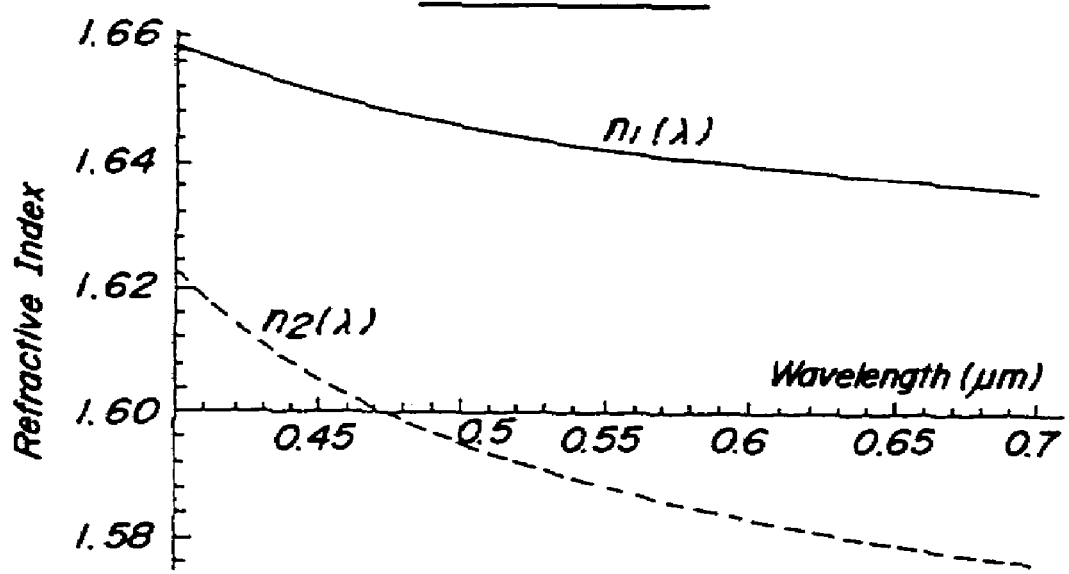

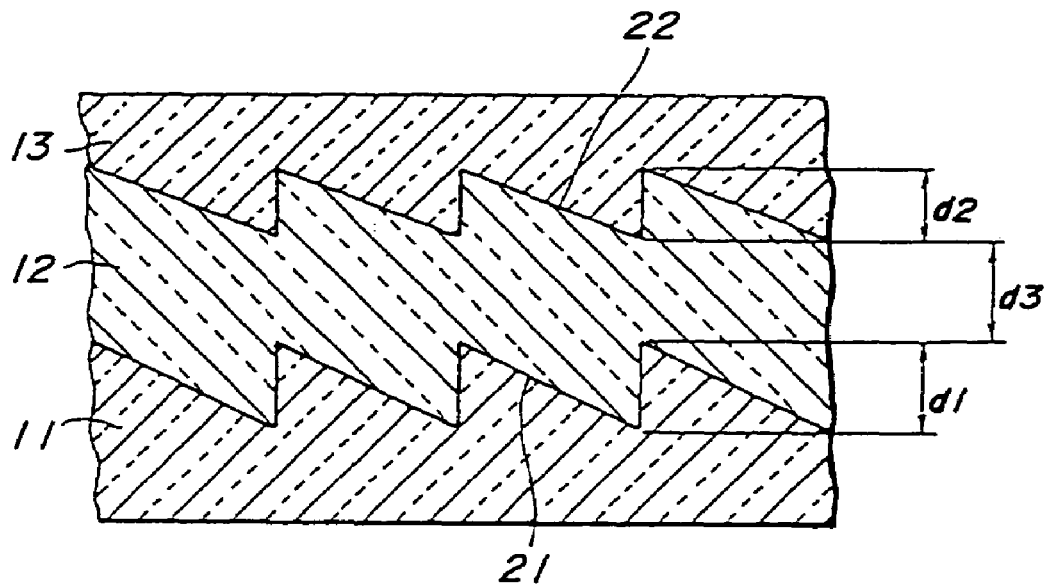
FIG_6
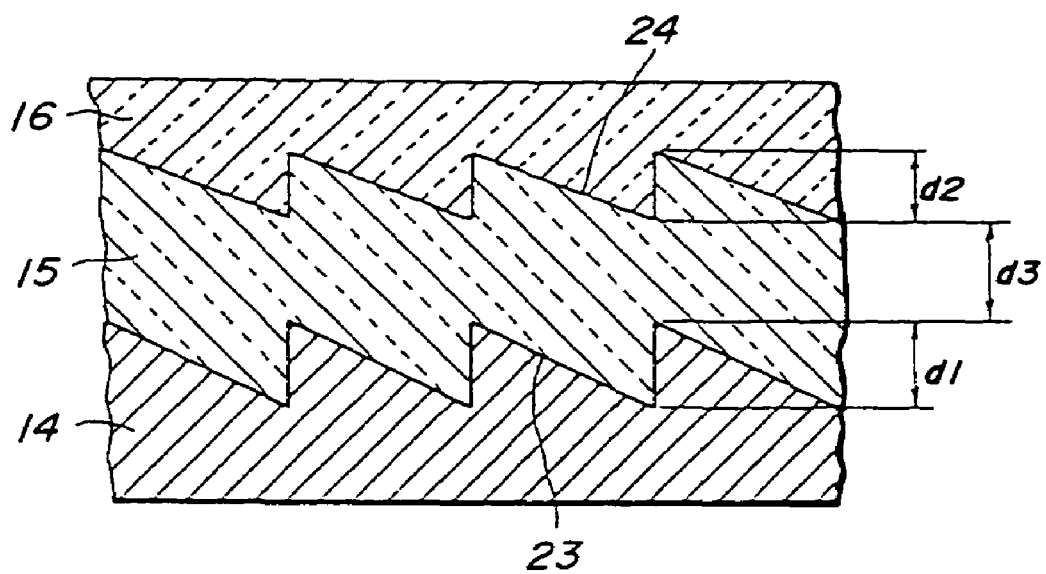
FIG_7

FIG_10
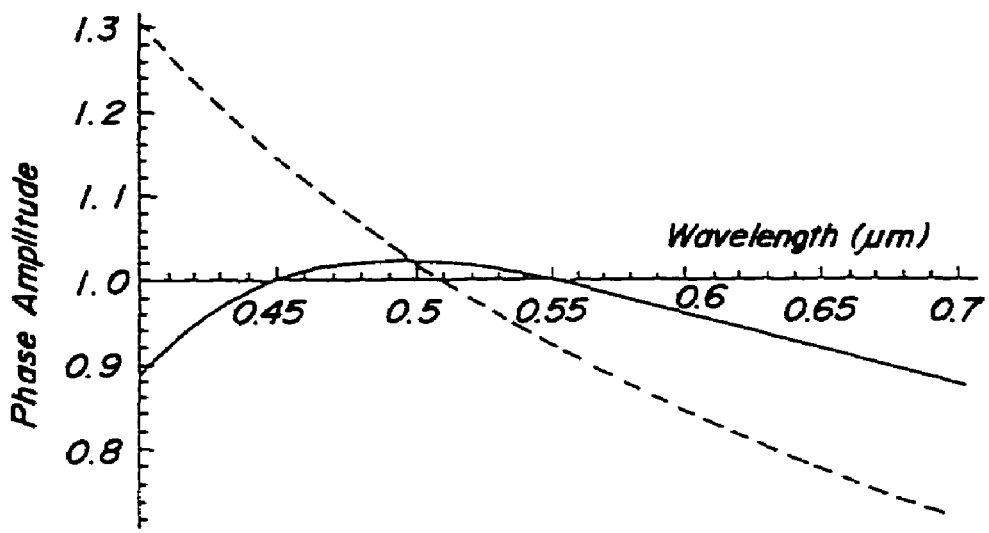
FIG_11
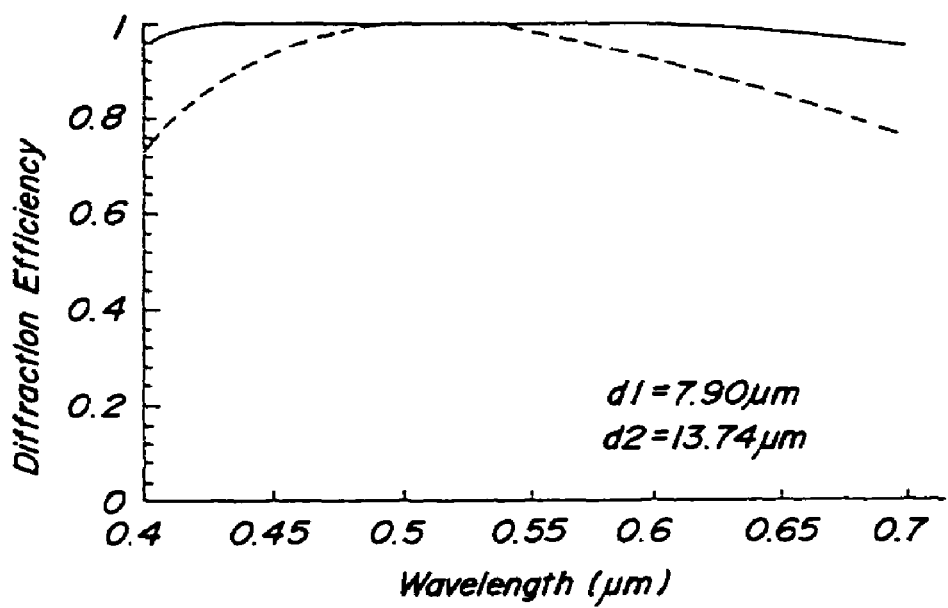

FIG_16
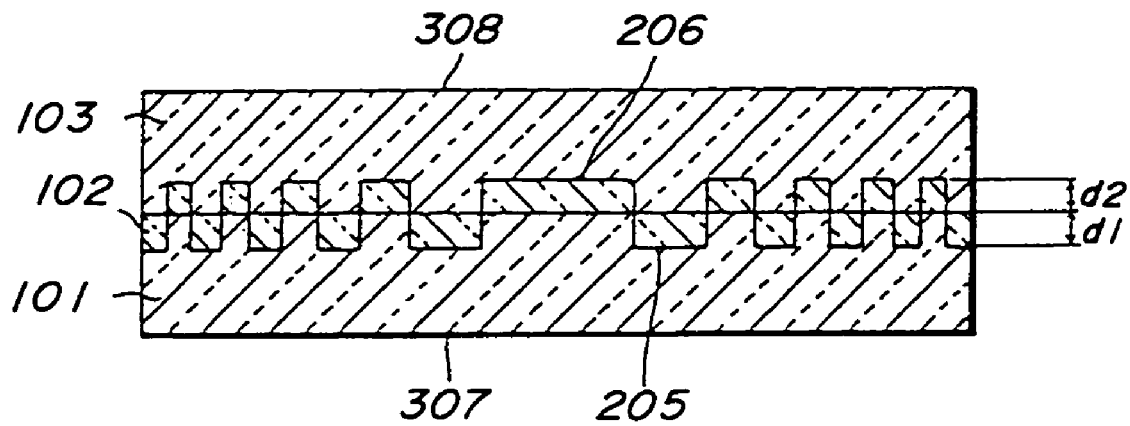
FIG_17
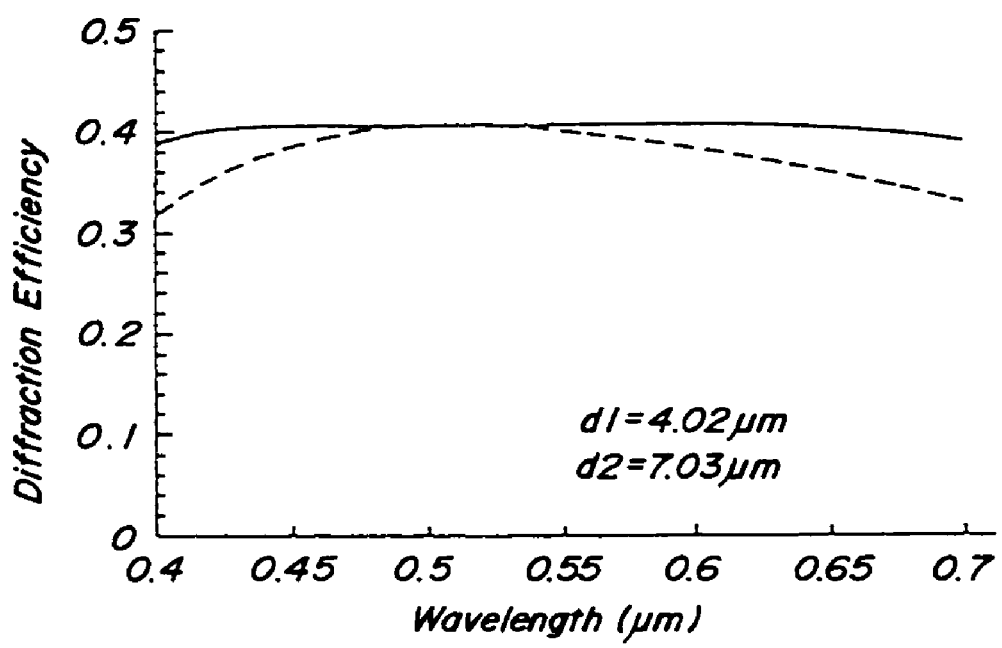

FIG_18
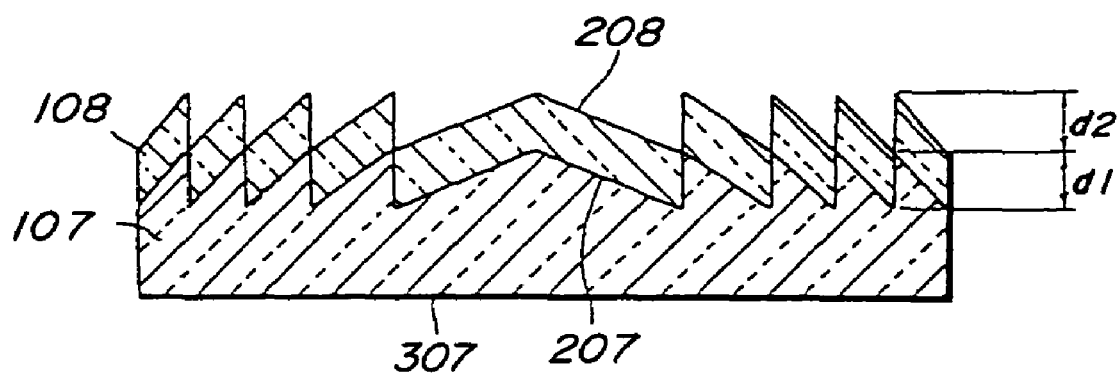
FIG_19
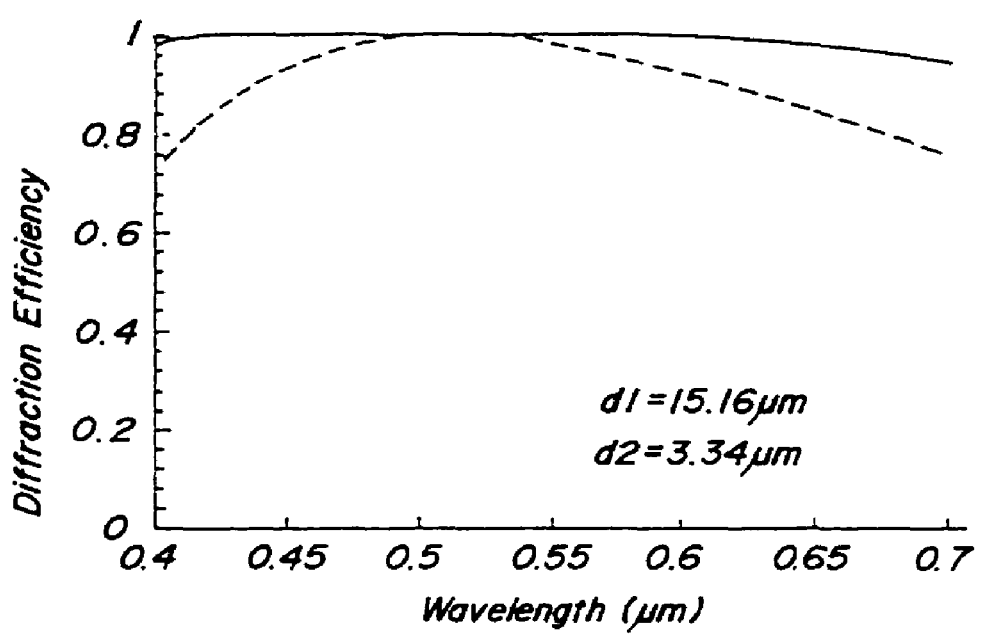

FIG_20
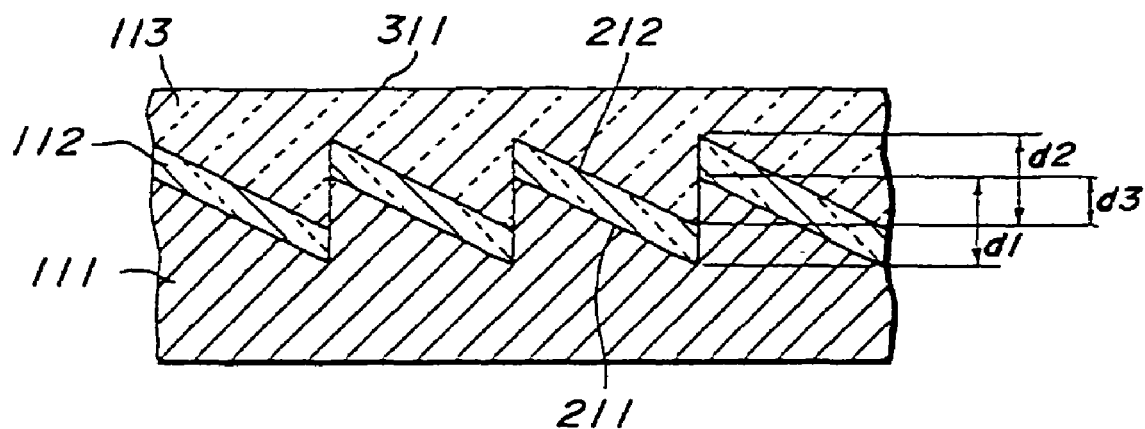
FIG_21
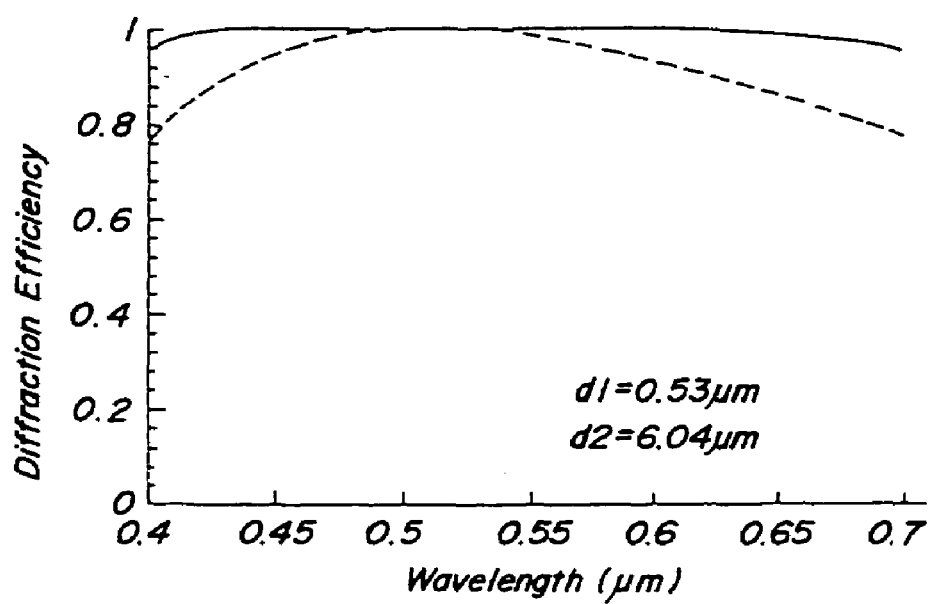

FIG_22
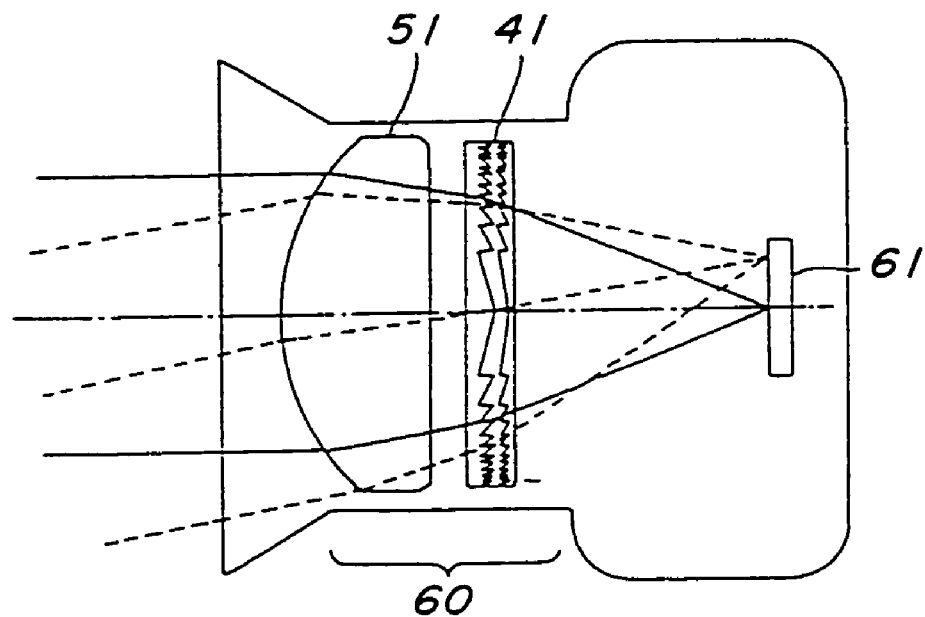
FIG_23
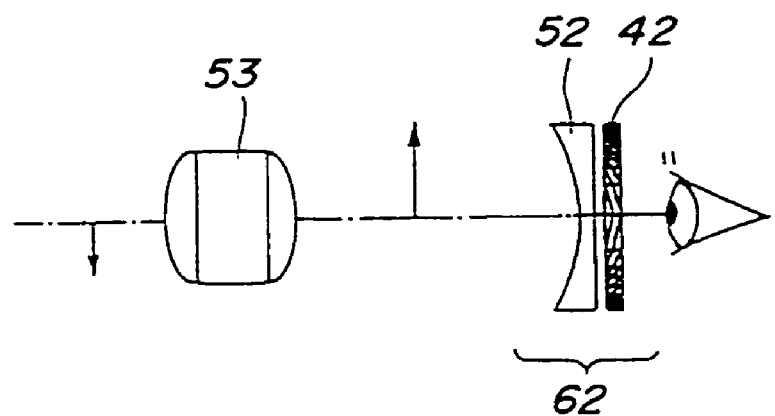

FIG_26
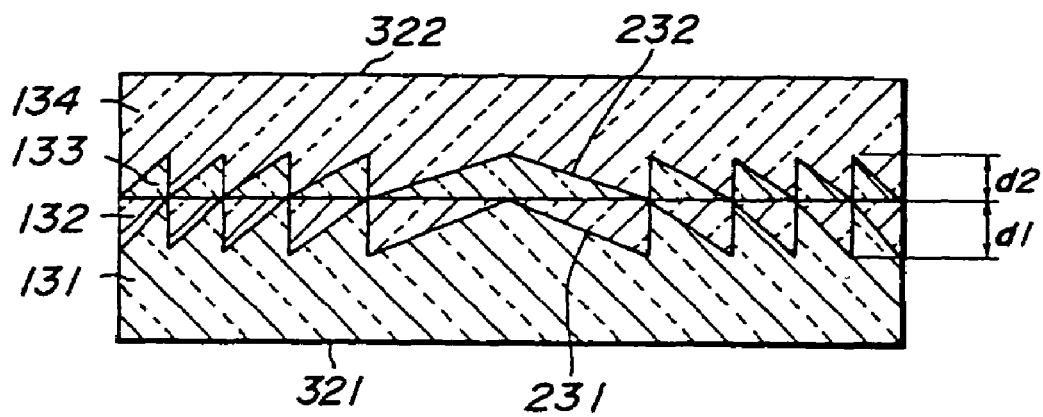
FIG_27
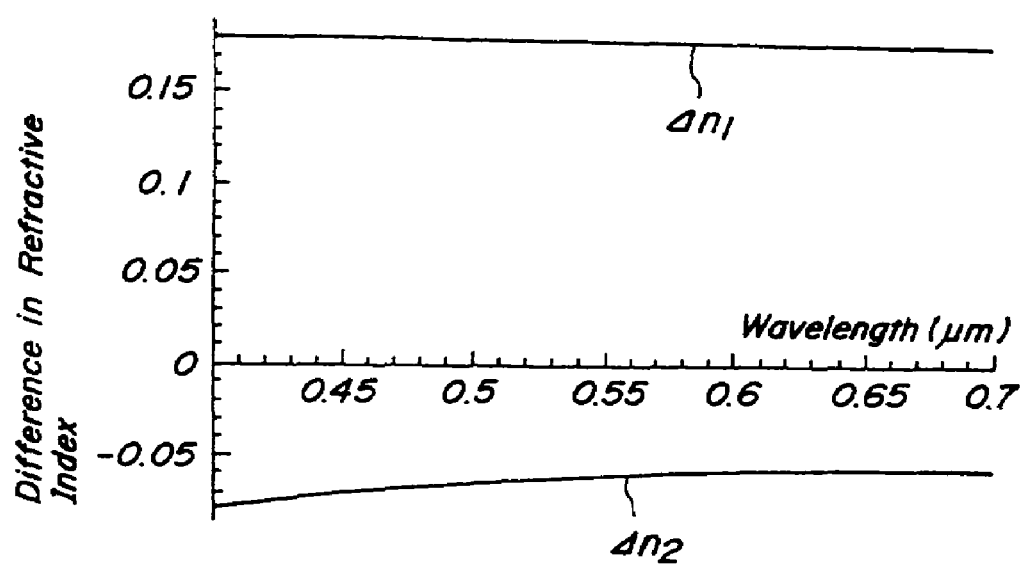

FIG_28
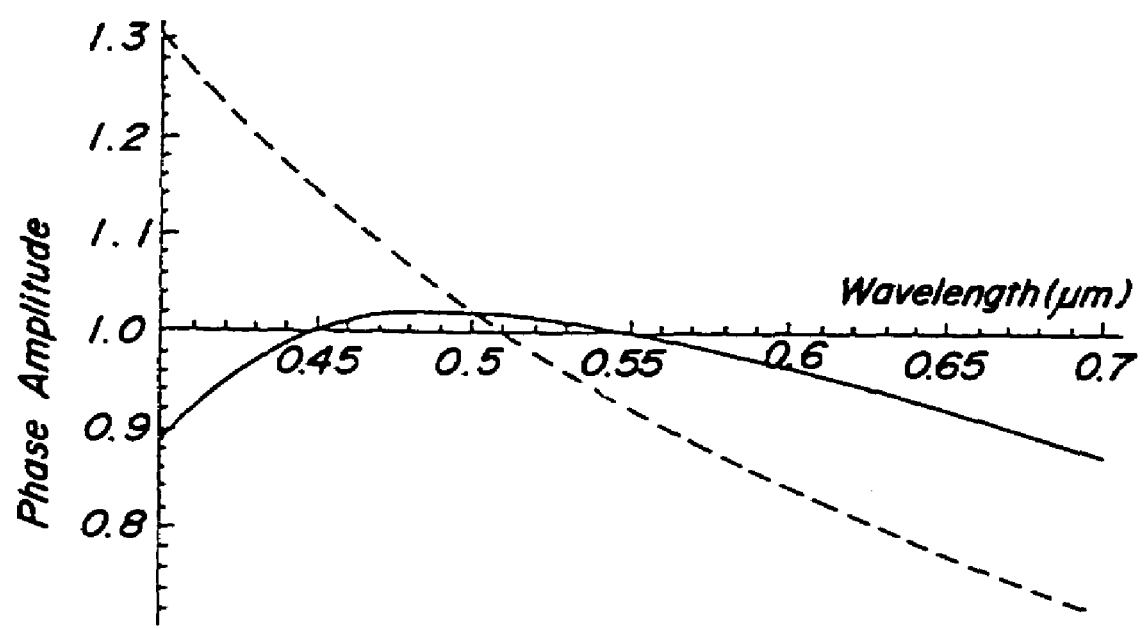

FIG_29
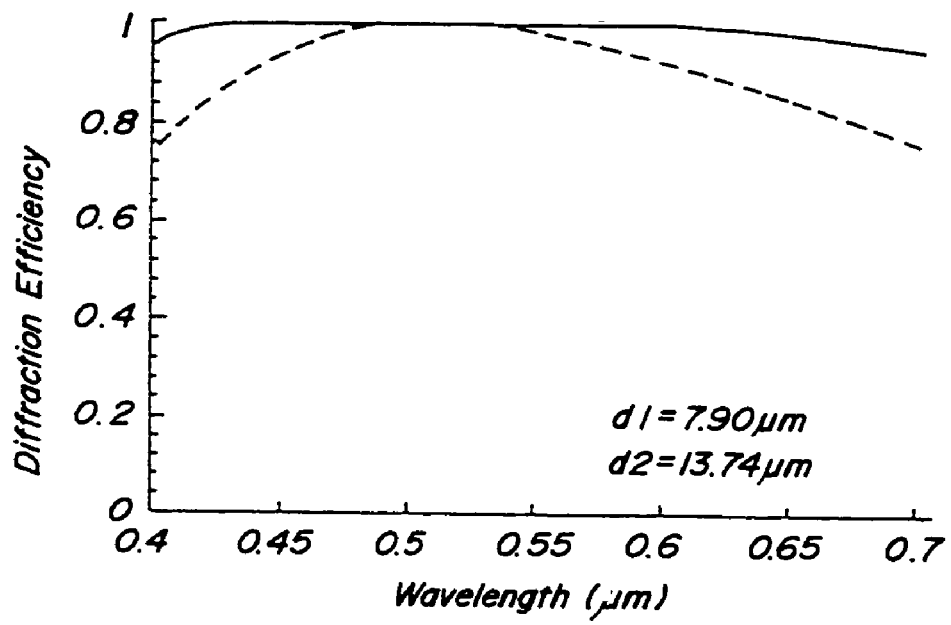
FIG_30
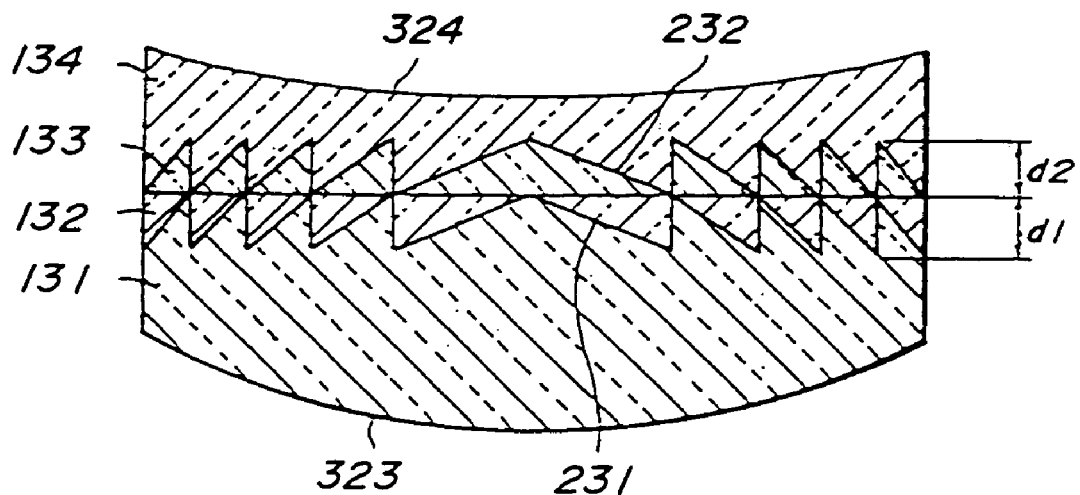

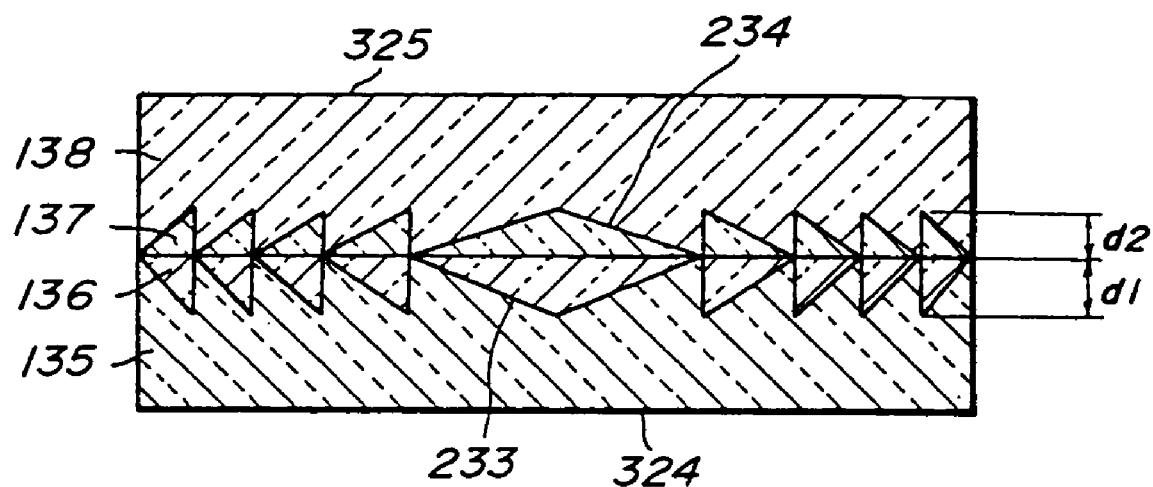
FIG_31

FIG_36
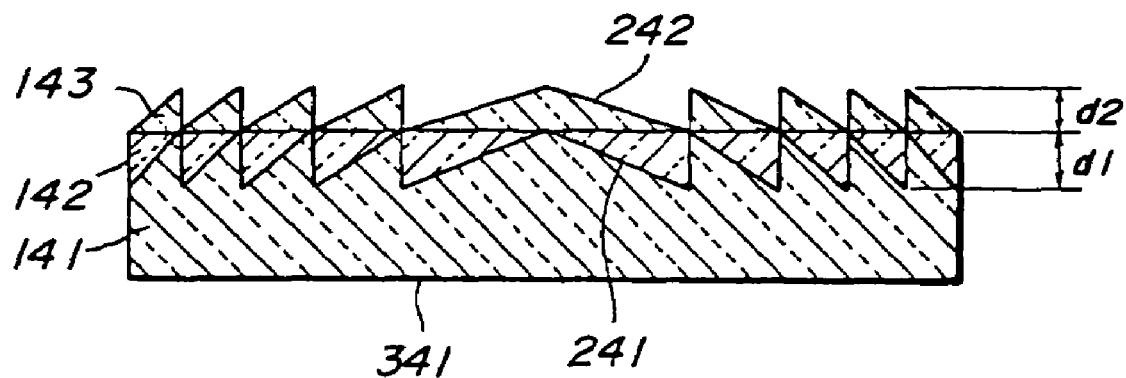
FIG_37
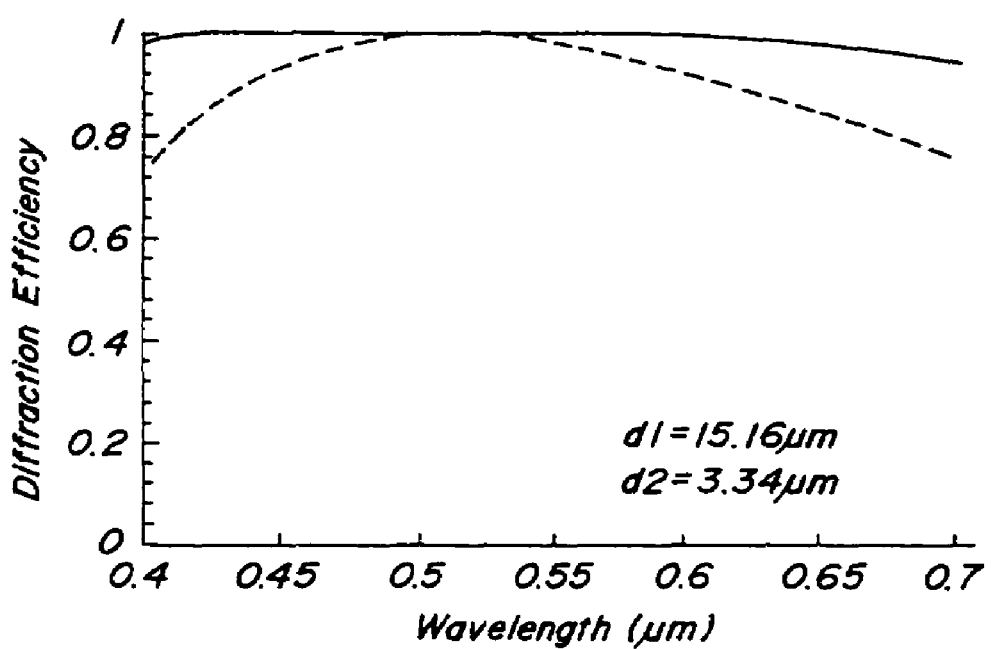

FIG_38
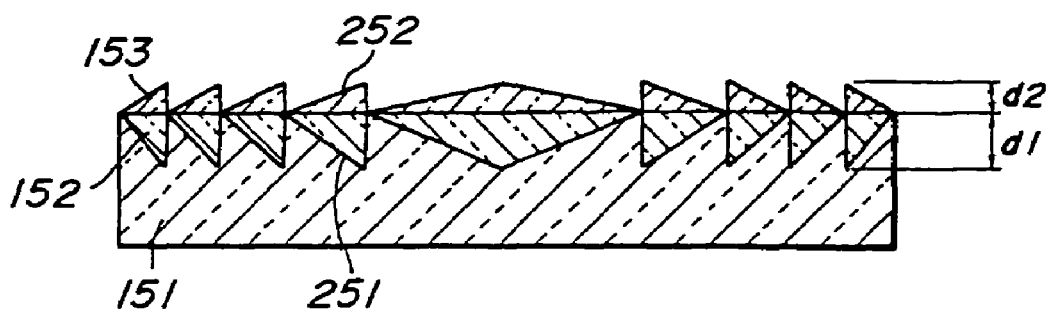
FIG_39
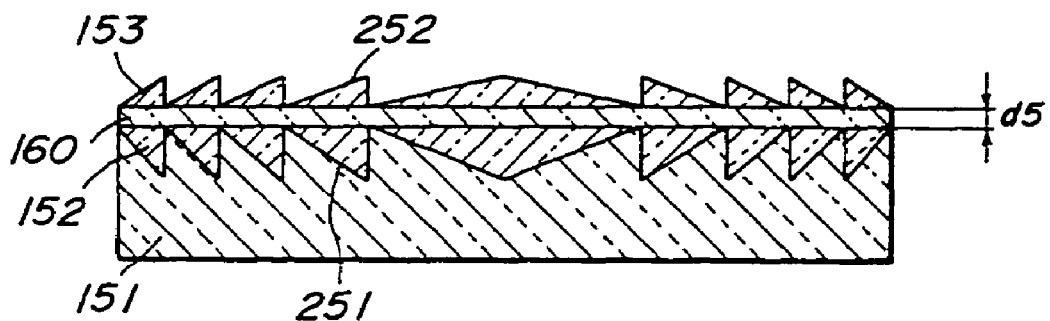
FIG_40
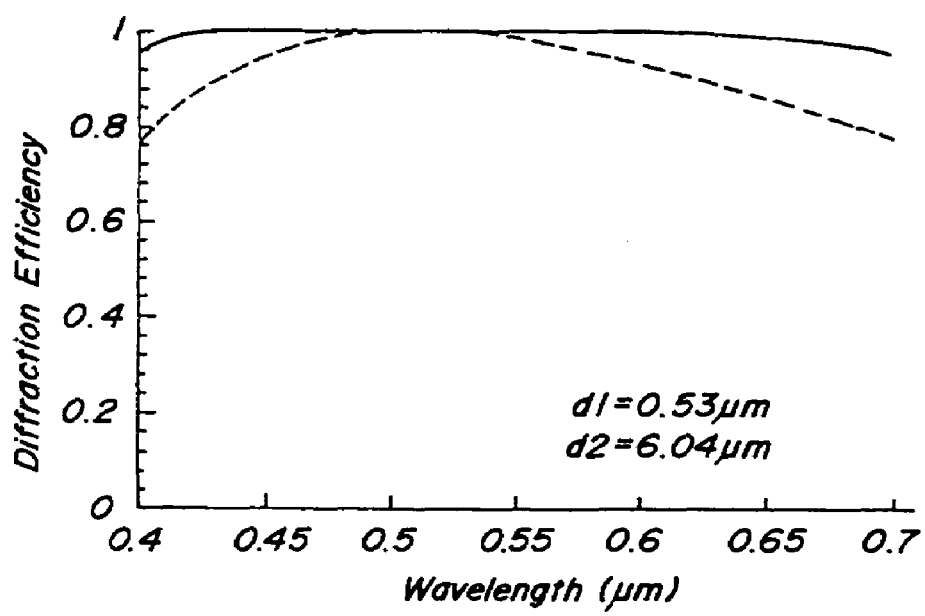

DIFFRACTIVE OPTICAL ELEMENT

This is a continuation of application Ser. No. 09/672,455 filed Sep. 29, 2000, now U.S. Pat. No. 6,781,756 which is a divisional of Ser. No. 08/697,773 filed Aug. 29, 1996 now U.S. Pat. No. 6,157,488.

BACKGROUND OF THE INVENTION

1. Field of the Invention

The present invention relates to a diffractive optical element comprising a plurality of layers stacked one another to form at least one boundary surface formed by adjacent layers made of different optical materials, and a relief pattern formed in said boundary surface, and more particularly to a diffractive optical element having a decreased wavelength dependency of diffraction efficiency for a wide wavelength range.

2. Related Art Statement

The diffractive optical element of the kind mentioned above is constituted as, for instance a diffractive lens having a converging power. Such a diffractive lens has the following advantages as compared with an ordinary refractive lens.
(1) The diffractive lens can be easily produce an aspherical wave, so that aberrations can be corrected effectively.
(2) The diffractive lens does not substantially have a thickness, so that an optical system including such a diffractive lens can be made compact and a freedom of design can be improved.
(3) In the diffractive lens, a quantity corresponding to a dispersion of the refractive lens has a negative value, and thus chromatic aberration can be corrected effectively by a combination of a refractive element.

The diffractive optical element having the above advantages can improve a property of an optical system as described in, for instance Binary Optics Technology; the Theory and Design of Multi-level Diffractive Optical Element, Gary J. Swanson, Technical Report 854, MIT Lincoln Laboratory, August 1989.

As stated above, the diffractive optical element has many advantages over the ordinary refractive optical element. However, a diffractive efficiency of the diffractive optical element has a relatively large wavelength dependency, so that there are several problems to be solved. When the diffractive optical element is used as a lens element, it is undesired that there are formed a plurality of diffracted light rays, i.e. a plurality of focal points. Therefore, in a conventional diffractive lens shown in FIG. 1. a surface of a transparent substrate 1 is machined to have a sawtooth relief pattern 2 such that radiant energy is constricted to a diffracted beam having a predetermined order.

When the surface of the substrate 1 is machined to have the sawtooth cross sectional configuration as illustrated in FIG. 1, a wavelength of the diffracted beam to which radiant energy is constricted is dependent upon a depth of recesses of the relief pattern 2 (brazed relief pattern). Therefore, it is impossible to constrict the energy of the light beams within a wavelength range. This phenomenon does not cause any problem for a monochromatic radiation beam such as a laser beam, but could not be ignored for an optical system such as a camera in which white light is dealt with.

When a plurality of wavelengths are used, in order to correct a chromatic aberration a diffraction efficiency has to be optimized for a predetermined single wavelength. Then a diffraction efficiency is decreased for wavelengths other than said predetermined wavelength. Particularly, when the diffractive optical element is applied to an image pick-up optical system for picking-up a visible light image, there might be produced a variation in color and flare due to light beams of undesired orders.

FIG. 2 is a graph showing a wavelength dependency of a first order diffraction efficiency of the known diffractive optical element having the substrate 1 made of BK7 and the relief pattern 2 having such a depth that a first order diffraction efficiency becomes 100% for a wavelength $\lambda=520$ nm. As can be seen from the graph of FIG. 2, within a visible wavelength range from 400 nm to 700 nm, a diffractive efficiency becomes maximum at a wavelength of 520 nm and becomes smaller as a wavelength departs from the optimum wavelength of 520 nm. Particularly, a diffractive efficiency is decreased largely when a wavelength becomes shorter than 520 nm. Such a decrease in a diffractive efficiency for wavelengths other than the predetermined wavelength might cause undesired effect upon an optical system due to an increase in light beams of undesired orders. This apparently affects the function of the optical system including the diffractive optical element.

The relief pattern 2 having the sawtooth cross sectional shape as shown in FIG. 1 may be represented by a phase shift function $\phi(x)$ illustrated in FIG. 3. This function $\phi(x)$ characterizes a wave front modulation by the relief pattern, and can be expressed by a periodic function corresponding to the sawtooth configuration of the relief pattern. An m-order diffraction efficiency $\eta m$ of the relief pattern expressed by the phase shift function $\phi(x)$ may be given as follows:

$$\eta_m = \left\{ \frac{\sin(m-a)\pi}{(m-a)\pi} \right\}^2 \quad (1)$$

wherein a is a amplitude of variation and will be expressed as a phase amplitude hereinafter.

In the equation (1), the phase amplitude a may be defined by a the following equation:

$$a = \frac{(n-1)d}{\lambda} \quad (2)$$

wherein n is a refractive index of the substrate 1, d is a depth of the recess, and ($\lambda$) is a wavelength of light to be used. It should be noted that a refractive index of an air is assumed to be a unit. When a depth $d_0$ is optimized such that a diffraction efficiency of $m_0$ order for a wavelength $\lambda_0$ becomes 100%, the depth $d_0$ may be expressed as follows:

$$d_0 = \frac{m_0 \lambda_0}{n(\lambda_0) - 1} \quad (3)$$

Then, the phase amplitude a ($\lambda$) may be represented by the following equation (4).

$$a(\lambda) = m_0 \cdot \frac{n(\lambda) - 1}{n(\lambda_0) - 1} \cdot \frac{\lambda_0}{\lambda} \quad (4)$$

The above equation (4) means that for a given depth $d_0$ the phase amplitude is dependent upon the wavelength. Due to this dependency of the phase amplitude a upon the wavelength, the wavelength dependency of the diffraction efficiency occurs as shown in FIG. 2.

The inventor has investigated the mechanism of the wavelength dependency of diffraction efficiency and has proposed a novel relief type diffractive optical element in which the wavelength dependency of diffraction efficiency is reduced. This diffractive optical element is disclosed in a co-pending U.S. patent application Ser. No. 08/522,292 filed on Sep. 7, 1995. This diffractive optical element is illustrated in FIG. 4 of the instant application. In this optical element, a first optical layer 3 made of an optical material having a high refractive index and a low dispersion and a second optical layer 4 made of an optical material having a low refractive index and a high dispersion are stacked such that a relief pattern 5 is formed in a boundary surface of these layers. It should be noted that the dispersion means a dispersion of a refractive index for a variation of a wavelength. When the relief pattern 5 is shaped into a sawtooth configuration, a phase amplitude a (λ) may be given by the following equation (5) upon optimizing the recess depth in such a manner that the diffraction efficiency of $m_0$ order for a wavelength $\lambda_0 n_2(\lambda)$ becomes 100%.

$$a(\lambda) = m_0 \cdot \frac{n_1(\lambda) - n_2(\lambda)}{n_1(\lambda_0) - n_2(\lambda_0)} \cdot \frac{\lambda_0}{\lambda} \quad (5)$$

wherein $n_0(\lambda)$ is a refractive index of the first optical layer 3 and $n_2(\lambda)$ is a refractive index of the second optical layer 4.

In the above equation (5), when $n_1(\lambda) > n_2(\lambda)$ is satisfied as shown in FIG. 5 for a whole wavelength range to be used, a difference in a refractive index in a numerator becomes increased in accordance with an increase in the wavelength λ, and thus a variation of the wavelength λ in a denominator is canceled out. Therefore, the wavelength dependency of phase amplitude is reduced and thus the wavelength dependency of diffraction efficiency can be also reduced.

However, in practice, many optical materials having a large refractive index have also a large dispersion. Therefore, it is very difficult to find out a suitable combination of the first and second optical layers 3 and 4. For instance, there have been various kinds of optical materials which can be used for a visible wavelength range, but in these materials, a dispersion is increased in accordance with in increase in a refractive index. Moreover, almost all optical materials for a visible wavelength range are made of optical glasses which could not be machined easily. Therefore, when these optical glasses are combined, it is difficult to form a desired relief pattern in a boundary surface therebetween. In order to mitigate such a drawback, at least one of the optical layers may be made of optical plastic material which can be machined relatively easily. However, in such a case, plastic materials are limited and thus it is difficult to select a suitable combination of optical materials of the two optical layers 3 and 4. Particularly, it is quite difficult to improve the wavelength dependency of diffraction efficiency by a combination of two plastic materials.

SUMMARY OF THE INVENTION

The present invention has for its object to provide a novel and useful diffractive optical element, which can be manufactured easily and can suppress undesired flare and ghost by decreasing a wavelength dependency of diffraction efficiency.

According to a first aspect of the invention, a diffractive optical element comprises:

a first optical region made of a first optical material which is substantially transparent to light within a wavelength range to be used;

a second optical region made of a second optical material which is substantially transparent to said light but is different from said first optical material;

a third optical region made of a third optical material which is transparent to said light but is different from said second optical material, said first, second and third optical regions being arranged to be brought into contact with each other or being arranged close to each other;

a first relief pattern formed in a boundary surface between said first and second optical regions and having a first pitch distribution and a first depth; and a second relief pattern formed in a boundary surface between said second and third optical regions and having a second pitch distribution which is substantially identical with said first pitch distribution of the first relief pattern and a second depth which is different from said first depth of the first relief pattern, said first and second relief patterns being substantially aligned in a direction of an optical axis of the diffractive optical element.

According to a second aspect of the invention, a diffractive optical element comprises:

a first optical region made of a first optical material which reflects light within a wavelength range to be used;

a second optical region made of a second optical material which is substantially transparent to said light;

a third optical region made of a third optical material which is substantially transparent to said light but is different from said second optical material, said first, second and third optical regions being arranged to be brought into contact with each other or being arranged close to each other;

a first relief pattern formed in a boundary surface between said first and second optical regions and having a first pitch distribution and a first depth; and a second relief pattern formed in a boundary surface between said second and third optical regions and having a second pitch distribution which is substantially identical with said first pitch distribution of the first relief pattern and a second depth which is different from said first depth of the first relief pattern, said first and second relief patterns being substantially aligned in a direction of an optical axis of the diffractive optical element.

According to a third aspect of the invention, a diffractive optical element comprises:

a first optical region made of a first optical material which is substantially transparent to light within a wavelength range to be used and has a refractive index $n_1$;

a second optical region made of a second optical material which is substantially transparent to said light but is different from said first optical material and has a refractive index $n_2$;

a third optical region made of a third optical material which is transparent to said light but is different from said first and second optical materials and has a refractive index $n_3$, said first, second and third optical regions being arranged to be brought into contact with each other or being arranged close to each other;

a first relief pattern formed in a boundary surface between said first and second optical regions and having a first pitch distribution and a depth $d_1$; and a second relief pattern formed in a boundary surface between said second and third optical regions and having a second pitch distribution which is substantially identical with said first pitch distribution of the first relief pattern and a second depth $d_2$, said first and second relief patterns being substantially aligned in a direction of an optical axis of the diffractive optical element, wherein when a ratio of the depth of the second relief pattern to the depth of the second relief pattern is $\alpha(=d_2/d_1)$, a wavelength of the light to be used is $\lambda$, a shortest wavelength of a wavelength region of the light to be used is $\lambda_1$, and a longest wavelength of the light is $\lambda_2$, the following condition is satisfied:

$$|\Delta N(\lambda_2)| > |\Delta N(\lambda_1)| > 0; \lambda_2 > \lambda_1 \qquad (6)$$

wherein $$\Delta N(\lambda) = \{n_1(\lambda) - n_2(\lambda)\} + \alpha\{n_2(\lambda) - n_3(\lambda)\} \qquad (7)$$

According to a fourth aspect of the invention, a diffractive optical element comprises:

a first optical region made of a first optical material which is substantially transparent to light within a wavelength range to be used;

a second optical region made of a second optical material which is substantially transparent to said light but is different from said first optical material;

a third optical region made of a third optical material which is substantially transparent to said light;

a fourth optical region made of a fourth optical material which is transparent to said light but is different from said third optical material, said first, second, third and fourth optical regions being arranged to be brought into contact with each other or being arranged close to each other;

a first relief pattern formed in a boundary surface between said first and second optical regions and having a first pitch distribution and a first depth; and a second relief pattern formed in a boundary surface between said third and fourth optical regions and having a second pitch distribution which is substantially identical with said first pitch distribution of the first relief pattern and a second depth which is different from said first depth of the first relief pattern, said first and second relief patterns being aligned in a direction of an optical axis of the diffractive optical element.

According to a fifth aspect of the invention, a diffractive optical element comprises:

a first optical region made of a first optical material which reflects light within a wavelength range to be used;

a second optical region made of a second optical material which is substantially transparent to said light;

a third optical region made of a third optical material which is substantially transparent to said light;

a fourth optical region made of a fourth optical material which is substantially transparent to said light but is different from said third optical material, said first, second, third and fourth optical regions being arranged to be brought into contact with each other or being arranged close to each other;

a first relief pattern formed in a boundary surface between said first and second optical regions and having a first pitch distribution and a first depth; and a second relief pattern formed in a boundary surface between said third and fourth optical regions and having a second pitch distribution which is substantially identical with said first pitch distribution of the first relief pattern and a second depth which is different from said first depth of the first relief pattern, said first and second relief patterns being substantially aligned in a direction of an optical axis of the diffractive optical element.

According to a sixth aspect of the invention, a diffractive optical element comprises:

a first optical region made of a first optical material which is substantially transparent to light within a wavelength range to be used and has a refractive index $n_1$;

a second optical region made of a second optical material which is substantially transparent to said light but is different from said first optical material and has a refractive index $n_2$;

a third optical region made of a third optical material which is substantially transparent to said light and has a refractive index $n_3$;

a fourth optical region made of a fourth optical material which is transparent to said light but is different from said third optical material and has a refractive index $n_4$, said first, second, third and fourth optical regions being arranged to be brought into contact with each other or being arranged close to each other;

a first relief pattern formed in a boundary surface between said first and second optical regions and having a first pitch distribution and a first depth $d_1$; and a second relief pattern formed in a boundary surface between said third and fourth optical regions and having a second pitch distribution which is substantially identical with said first pitch distribution of the first relief pattern and a second depth $d_2$, said first and second relief patterns being substantially aligned in a direction of an optical axis of the diffractive optical element; wherein a ratio of the first depth to the depth of the second depth is $\alpha(=d_2/d_1)$, a wavelength of the light to be used is $\lambda$, a shortest wavelength of a wavelength region of the light to be used is $\lambda_1$, and a longest wavelength is $\lambda_2$, the following condition is satisfied:

$$|\Delta N(\lambda_2)| > |\Delta N(\lambda_1)| > 0; \lambda_2 > \lambda_1 \qquad (8)$$

wherein $$\Delta N(\lambda) = \{n_1(\lambda) - n_2(\lambda)\} + \alpha\{n_3(\lambda) - n_4(\lambda)\} \qquad (9)$$

It should be noted that according to the invention, the first and second relief patterns are substantially aligned in the direction of the optical axis of the diffractive optical element. This includes two cases; in a first case top and bottom portions of the first relief patterns are substantially aligned with top and bottom portions of the second relief pattern, respectively viewed in the direction of the optical axis, and in a second case, top an bottom portions of the first relief pattern are substantially aligned with bottom and top portions of the second relief pattern, respectively viewed in the direction of the optical axis. In the first case, it may be stated that the first and second relief patterns can be considered to be arranged in the same direction, whilst in the second case, it may be said that the second relief pattern is opposed to the first relief pattern.

BRIEF DESCRIPTION OF THE DRAWINGS

FIG. 1 is a cross sectional view showing a known diffractive optical element;

FIG. 2 is a graph denoting a wavelength dependency of diffraction efficiency of the known element shown in FIG. 1;

FIG. 3 is a graph expressing a phase shift function of the diffractive optical element of FIG. 1;

FIG. 4 is a cross sectional view illustrating a diffractive optical element disclosed in a co-pending U.S. patent application;

FIG. 5 is a graph denoting wavelength dependencies of refractive indices of the diffractive optical element shown in FIG. 4;

FIG. 6 is a schematic cross sectional view depicting a principal structure of the diffractive optical element according to a first aspect of the invention;

FIG. 7 is a schematic cross sectional view depicting a principal structure of the diffractive optical element according to a second aspect of the invention;

FIG. 10 is a graph showing wavelength dependencies of phase amplitude of the first embodiment and a known diffractive optical element;

FIG. 11 is a graph denoting wavelength dependencies of diffraction efficiency of the first embodiment and the known diffractive optical element;

FIG. 16 is a cross sectional view showing a third embodiment of the diffractive optical element according to the invention;

FIG. 17 is a graph representing wavelength dependencies of diffraction efficiency of the third embodiment and a known diffractive optical element;

FIG. 18 is a cross sectional view illustrating a fourth embodiment of the diffractive optical element according to the invention;

FIG. 19 is a graph expressing wavelength dependencies of diffraction efficiency of the fourth embodiment and a known diffractive optical element;

FIG. 20 is a cross sectional view depicting a fifth embodiment of the diffractive optical element according to the invention;

FIG. 21 is a graph denoting wavelength dependencies of diffraction efficiency of the fifth embodiment and a known diffractive optical element;

FIG. 22 is a schematic view illustrating an image pick-up device comprising the diffractive optical element according to the invention;

FIG. 23 is a schematic view showing a view finder comprising the diffractive optical element according to the invention;

FIG. 26 is a cross sectional view illustrating a sixth embodiment of the diffractive optical element according to the invention;

FIG. 27 is a graph representing wavelength dependencies of differences in refractive index between successive optical regions of the sixth embodiment;

FIG. 28 is a graph showing wavelength dependencies of phase amplitude of the sixth embodiment and a known diffractive optical element;

FIG. 29 is a graph expressing wavelength dependencies of diffraction efficiency of the sixth embodiment and the known diffractive optical element;

FIG. 30 is a cross sectional view showing a modification of the sixth embodiment shown in FIG. 8;

FIG. 31 is a cross sectional view depicting a second embodiment of the diffractive optical element according to the invention;

FIG. 36 is a cross sectional view showing a ninth embodiment of the diffractive optical element according to the invention;

FIG. 37 is a graph expressing wavelength dependencies of diffraction efficiency of the ninth embodiment and a known diffractive optical element;

FIG. 38 is a cross sectional view showing a tenth embodiment of the diffractive optical element according to the invention;

FIG. 39 is a cross sectional view depicting a modification of the tenth embodiment of the diffractive optical element according to the invention; and FIG. 40 is a graph expressing wavelength dependencies of diffraction efficiency of the tenth embodiment and a known diffractive optical element.

DESCRIPTION OF THE PREFERRED EMBODIMENTS

Figure 8:
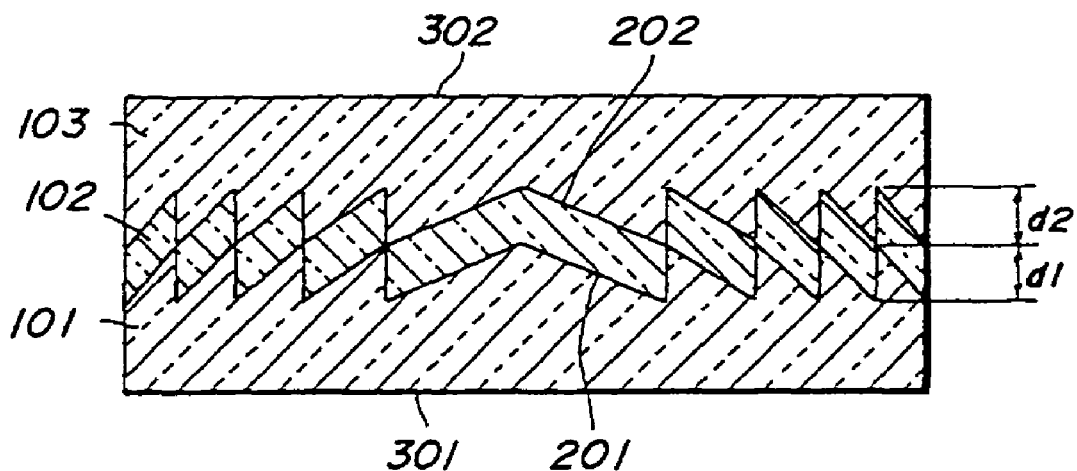
FIG. 8 is a cross sectional view illustrating a first embodiment of the diffractive optical element according to the invention.

FIG. 6 is a schematic cross sectional view illustrating a portion of an embodiment of the diffractive optical element according to the first aspect of the invention. The diffractive optical element comprises first, second and third optical regions 11, 12 and 13, which are stacked one on the other successively, a first relief pattern 21 formed in a boundary surface between the first and second regions 11 and 12, and a second relief pattern 22 formed in a boundary surface between the second and third regions 12 and 13. The first, second and third optical regions 11, 12 and 13 are made of different optical materials which are substantially transparent to light within a wavelength range to be used, but have different refractive indices $n_1$, $n_2$ and $n_3$, respectively.

The first and second relief patterns 21 and 22 are formed to have a sawtooth cross sectional configuration having the same pitch distribution. A depth of the first sawtooth relief pattern 21 is $d_1$, and a depth of the second sawtooth relief pattern 22 is $d_2$, and a distance between a top of the first relief pattern 23 and a bottom of the second relief pattern is $d_3$.

In the diffractive optical element shown in FIG. 6, light is made incident upon the diffractive optical element along an optical axis thereof which is a vertical direction in a plane of the drawing of FIG. 6. Then, the incident light is subjected to a phase modulation by the second and first relief patterns 21 and 22. In this case, a phase amplitude $a_1(\lambda)'$ of the first relief pattern 21 may be expressed as follows:

$$a_1(\lambda) = \frac{\Delta n_1(\lambda)}{\lambda} d_1; \; \Delta n_1(\lambda) = n_1(\lambda) - n_2(\lambda) \quad (10)$$

A phase amplitude $a_2(\lambda)$ of the second relief pattern 22 may be represented in the following manner:

$$a_2(\lambda) = \frac{\Delta n_2(\lambda)}{\lambda} d_2; \; \Delta n_2(\lambda) = n_2(\lambda) - n_3(\lambda) \quad (11)$$

Now it is assumed that the first and second relief patterns 21 and 22 are constructed into a single integral body and the light is modulated substantially at the same time. Then, a total phase amplitude $a(\lambda)$ which characterizes the phase shift function may be expressed by the following equation:

$$a(\lambda) = a_1(\lambda) + a_2(\lambda) = \frac{\Delta n_1(\lambda) + \alpha \Delta n_2(\lambda)}{\lambda} d_1 \quad (12)$$

For a specific wavelength $\lambda_0$, if a diffraction efficiency of $m_0$ order becomes 100%, $a(\lambda_0)=m_0$ is obtained. Therefore, when the depths of the first and second relief patterns 21 and 22 are optimized in such a manner that a diffraction efficiency of $m_0$ order becomes 100%, the following equation (13) may be obtained:

$$a(\lambda) = m_0 \frac{\Delta n_1(\lambda) + \alpha \Delta n_2(\lambda)}{\Delta n_1(\lambda_0) + \alpha \Delta n_2(\lambda_0)} \cdot \frac{\lambda_0}{\lambda} \quad (13)$$

wherein $\alpha$ is a value defined by a ratio of the depth $d_2$ of the second relief pattern 22 to the depth $d_1$ of the first relief pattern 21. That is $\alpha=d_2/d_1$.

As expressed by the equation (12), the phase amplitude $a(\lambda)$ of the diffractive optical element according to the first aspect of the invention is given by a sum of the phase amplitude $a_1(\lambda)$ of the first relief pattern 21 and the phase amplitude $a_2(\lambda)$ of the second relief pattern 22, and a wavelength dependency of the phase amplitude $a(\lambda)$ of the diffractive optical element is dependent upon the parameter $\alpha$. Here, the parameter $\alpha$ may be determined at will in regardless of the optimization of the diffraction efficiency for the specific wavelength $\lambda_0$.

In the diffractive optical element illustrated in FIG. 6, the first, second and third optical regions 11, 12 and 13 are made of different optical materials, and the differences in refractive index $\Delta n_1$ and $\Delta n_1$ have different wavelength dependencies from each other. Therefore, by changing the parameter $\alpha$, the wavelength dependency of the phase amplitude defined by the equation (13) can be varied.

As explained above, according to the first aspect of the invention, only the wavelength dependency of the diffraction efficiency at the specific wavelength $\lambda_0$ can be independently adjusted or controlled in a favorable manner by suitably setting the ratio of the depth of the second relief pattern to the depth of the first relief pattern, i.e. the parameter $\alpha$, while a diffractive efficiency at the specific wavelength $\lambda_0$ can be maintained to be optimum. In general, it is possible to optimize the wavelength dependency of the diffractive efficiency by making the depths different from each other ($\alpha \neq 1$). However, according to the invention, it is also possible to optimize the wavelength dependency of the diffraction efficiency by suitably combining the optical materials of the first, second and third optical regions even under a condition that $\alpha=1$.

FIG. 7 is a schematic cross sectional view illustrating the diffractive optical element according to the second aspect of the invention. The diffractive optical element comprises first, second and third optical regions 14, 15 and 16, which are stacked one on the other successively, a first relief pattern 23 formed in a boundary surface between the first and second regions 14 and 15, and a second relief pattern 24 formed in a boundary surface between the second and third regions 15 and 16. The first optical region 14 is made of a material which reflects light within a wavelength range to be used. The second and third optical regions 15 and 16 are made of different optical materials which are substantially transparent to light within the wavelength range to be used, but have different refractive indices $n_2$ and $n_3$, respectively.

The first and second relief patterns 21 and 22 are formed to have a sawtooth cross sectional configuration having the same pitch distribution like as the diffractive optical element illustrated in FIG. 6. A depth of the first sawtooth relief pattern is $d_1$, and a depth of the second sawtooth relief pattern is $d_2$, and a distance between a top of the first relief pattern 23 and a bottom of the second relief pattern is $d_3$.

In FIG. 7, light is made incident upon the diffractive optical element from the side of the third optical region 16 and is subjected to the phase modulation by the second and first relief patterns 24 and 23 in this order. The first relief pattern 23 is formed on the surface of the first optical region 14 made of the material which reflects the light, and thus the light is reflected by the first relief pattern 23. In this manner, the diffractive optical element of this embodiment serves as a reflection type diffractive optical element.

In the present diffractive optical element, it is also assumed that the first and second relief patterns 23 and 24 are constructed as a single integral body, so that the light impinging upon the diffractive optical element is modulated substantially simultaneously. Then, a phase amplitude of the diffractive optical element may be expressed by the following equation (14) when the depths of the first and second relief patterns 23 and 24 are set in such a manner that the diffraction efficiency of $m_0$ order for a specific wavelength $\lambda_0$ becomes 100%.

$$a(\lambda) = m_0 \cdot \frac{-n_2(\lambda) + \alpha\{n_2(\lambda) - n_3(\lambda)\}}{-n_2(\lambda_0) + \alpha\{n_2(\lambda_0) - n_3(\lambda_0)\}} \cdot \frac{\lambda_0}{\lambda} \quad (14)$$

This equation (14) corresponds to the equation (13) of the diffractive optical element shown in FIG. 6 and the parameter $\alpha$ is a ratio of the depth $d_2$ of the second relief pattern 24 to the depth $d_1$ of the first relief pattern 23.

The equation (14) may be obtained by setting the refractive index of the first optical region 14 in the equation (13) of the first embodiment shown in FIG. 6 to zero. This means that also in the present diffractive optical element, the phase amplitude can be expressed by the parameter α which may take an arbitrary value. Therefore, also in the present diffractive optical element, by suitably setting the parameter α, it is possible to control only the wavelength dependency of diffraction efficiency, while keeping the diffraction efficiency for the specific wavelength optimum like as the first embodiment.

In the first aspect of the invention, in order to further reduce the wavelength dependency of diffraction efficiency, it is necessary to decrease the wavelength dependency of phase amplitude $a(\lambda)$ in the equation (13). In this equation, the wavelength dependency of phase amplitude $a(\lambda)$ is determined by the two terms including the differences in refractive index $\Delta n_1(\lambda)$ in the numerator and $\lambda$ in the denominator. Therefore, in order to reduce this wavelength dependency, it is preferable to select the optical materials and said ratio of the depths in such a manner that an absolute value of a sum of the two differences in refractive index $\Delta N(\lambda)$ is increased in accordance with an increase in a wavelength $\lambda$. Said absolute value of a sum of the two differences in refractive index $\Delta N(\lambda)$ can be expressed by the following equation (15):

$$\Delta N(\lambda) = |\Delta n_1(\lambda) + \alpha \Delta n_2(\lambda)| \tag{15}$$

This is the third aspect of the present invention.

According to the third aspect of the invention, the numerator and denominator give opposite functions upon the wavelength dependency of diffraction efficiency, and thus it is possible to realize the diffractive optical element having a further reduced wavelength dependency of diffraction efficiency. The equation (13) is defined for the structure according to the first aspect of the invention, but the equation (14) may be obtained by setting $n_1(\lambda)=0$ in the equation (13), so that the explanation about the equation (15) may be also applied to the second aspect of the invention.

In case of actually selecting optical materials for the diffractive optical element, there are many optical materials, in which an absolute value of the difference in refractive index $\Delta n(\lambda)$ becomes decreased in accordance with an increase in a wavelength $\lambda$. This does not result in the desired wavelength dependency. That is to say, many available optical materials have high refractive index and high dispersion or low refractive index and low dispersion. In the first and second aspects of the invention, it is effective to setting a sign, i.e. positive or negative of the ratio α of depths of the grooves of the relief patterns such that the two terms including the difference in refractive index are canceled out. Then, the wavelength dependency opposite to the desired property can be canceled out. In this manner, by combining optical materials having high refractive index and high dispersion with optical materials having low refractive index and low dispersion, the wavelength dependency of diffraction efficiency can be further reduced. It should be noted that said combination can be easily realized.

Figure 13:
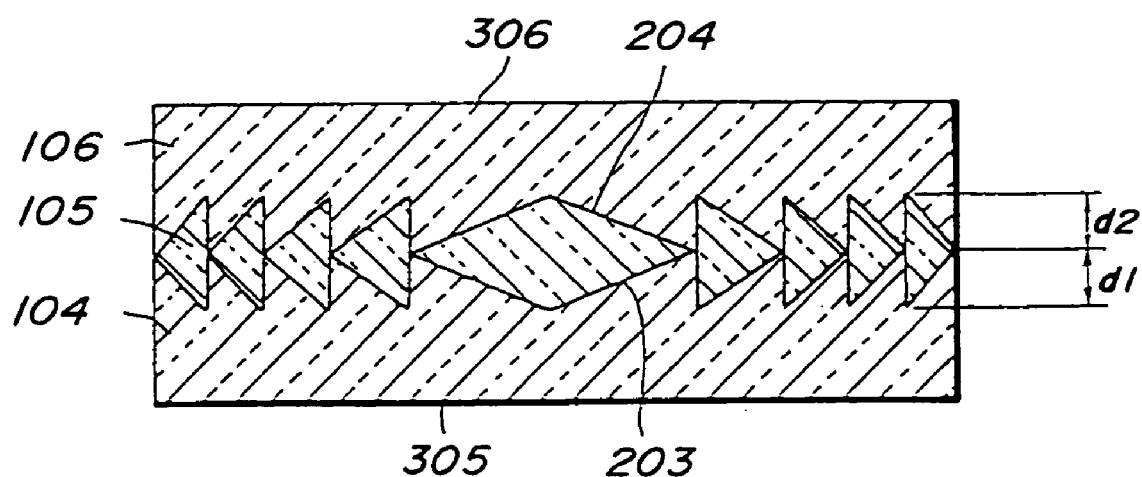
FIG. 13 is a cross sectional view depicting a second embodiment of the diffractive optical element according to the invention.

The sign of the ratio α can be determined by a manner of arranging the first and second relief patterns. When the first and second relief patterns are arranged such that tops and bottoms of the first pattern are aligned with tops and bottoms of the second pattern in the direction of the optical axis as illustrated in FIG. 8, the ratio α is positive. When the first and second relief patterns are arranged such that tops and bottoms of the first pattern are aligned with bottoms and tops of the second pattern in the direction of the optical axis as shown in FIG. 13, it is possible to obtain a negative ratio α.

In the first and second aspects of the invention, the third optical regions 13 and 16 may be an atmosphere which surrounds the diffractive optical element. In a usual condition, the diffractive optical element is placed in the air, and then the third optical regions 13 and 16 are constituted by the air. In this case, a difference in refractive index between the air and the transparent solid state optical material of the second optical region can be large. Therefore, a depth of grooves of the second relief pattern can be thin, and thus it is possible to realize the diffractive optical element having a superior property.

In general, the diffractive optical element may be classified into a thick type and a thin type. In case realizing a diffractive optical element for an image focusing optical system using light rays within a wavelength range, it is preferable to use the thin type one which has a relatively low incident angle dependency as well as a relatively low wavelength dependency. It has been well known to use a parameter Q characterizing a thickness of the diffractive optical element, said parameter being defined as follows:

$$Q = \frac{2\pi\lambda D}{n_0 T^2} \tag{16}$$

In general, when Q<1, a diffractive optical element is classified into the thin type. In the above equation (16), T is a pitch of a periodic structure of a relief pattern and $n_0$ is an average refractive index of the periodic structure. In the present invention, it is also preferable to construct the diffractive optical element to satisfy the condition Q<1.

From the equation (16), it can be understood that the parameter Q denoting the thickness of the diffractive optical element is dependent upon the wavelength. However, in order to keep a uniformity of the diffraction efficiency over a whole wavelength range to be used, it is sufficient that the above condition Q<1 is satisfied for a center wavelength within the whole wavelength range. Therefore, also in the present invention, it is preferable to construct the diffractive optical element such that the condition Q<1 is satisfied for a center wavelength. When the diffractive optical element is used for a visible light wavelength, the center wavelength may be set to a value within a range from 480 nm to 550 nm. Of course, it is much more preferable to construct the diffractive optical element to satisfy the condition Q<1 for the whole wavelength range.

The inventor has confirmed that when Q<0.1, the relief type diffractive optical element can have characteristics of the thin type in an efficient manner. Therefore, according to the invention, it is preferable to construct the periodic structure to satisfy the condition Q<0.1.

In the embodiment shown in FIG. 6, the depth D and average refractive index $n_0$ of the periodic structure may be expressed as follows:

$$D = d_1 + d_2 + d_3 \tag{17}$$

$$n_0 = \frac{d_1 \frac{n_1+n_2}{2} + d_2 \frac{n_2+n_3}{2} + d_3 n_2}{d_1 + d_2 + d_3} \tag{18}$$

In the embodiment shown in FIG. 7, the depth D and average refractive index $n_0$ of the periodic structure may be expressed as follows:

$$D = 2(d_1 + d_2 + d_3) \tag{19}$$

$$n_0 = \frac{d_1 \frac{n_2}{2} + d_2 \frac{n_2 + n_3}{2} + d_3 n_2}{d_1 + d_2 + d_3} \quad (20)$$

It should be noted that the diffractive optical element according to the invention is particularly suitable for a wavelength wider than a given amount. In conventional diffractive optical element in which the diffraction efficiency is optimized for an arbitrary wavelength $\lambda$, a width of a wavelength range in which a variation of the diffraction efficiency can be neglected is about 5%. Therefore, the diffractive optical element according to the invention can be advantageously used for a wavelength range which is wider than 5% of a center wavelength $\lambda$.

The above explanation is described for a case in which the first, second and third optical regions are brought into contact with each other. However, this may be also applied to a diffractive optical element in which said optical regions are brought closer to each other by means of cementing layers provided between adjacent optical regions.

The diffractive optical element according to the invention may be used for general optical systems in which a plurality of wavelengths within a wavelength range are used, but the diffractive optical element according to the invention can be particularly advantageously used in a visible light image focusing optical system.

FIG. 22 is a schematic view showing a camera in which the diffractive optical element according to the invention is utilized as an image pick-up lens. In FIG. 22, an image pick-up optical system 60 comprises a refractive type lens 51 and a diffractive optical element 41 according to the invention. The image pick-up optical system 60 forms a visible image of an object on an image pick-up device 61 such as CCD. The diffractive optical element 41 according to the invention has a very high diffractive efficiency over a whole visible wavelength range, and therefore it is possible to effectively suppress undesired flare and ghost in case of picking-up a color image.

FIG. 23 is a schematic view illustrating another optical system in which the diffractive optical element according to the invention is installed. In the present embodiment, the optical 1 system is constructed as a view finder of a camera or an ocular optical system of a microscope. In FIG. 23, an objective lens 53 forms a real image of an object, and a use observes an enlarged imaginary image of the thus formed real image. The ocular optical system 62 comprises a refractive lens 52 and a diffractive optical element 42 according to the invention. Also in this case, the same advantage as that of the image pick-up device shown in FIG. 22 can be attained.

Now several embodiments of the diffractive optical element according to the invention will be explained in detail.

FIG. 8 shows a first embodiment of the diffractive optical element according to the invention. The embodiment is a transmission type diffractive lens. A first optical region 101 is made of an optical glass LaL14 (trade name; nd=1.6968, $\upsilon$d=55.5) manufactured and sold by OHARA company, the second optical region 102 is made of a UV curable resin (nd=1.52, $\upsilon$d=52), and the third optical region 103 is made of a polycarbonate (nd=1.58, $\upsilon$d=30.5). These optical regions are stacked one on the other. A first relief pattern 201 is formed in a boundary surface between the first and second optical regions 101 and 102, and a second relief pattern 202 is formed in a boundary surface between the second and third optical regions 102 and 103. The first and second relief patterns 201 and 202 have an identical pitch distribution and are aligned in a direction of an optical axis in such a manner that top and bottom portions of the first relief pattern are aligned with top and bottom portions of the second relief pattern viewed in the direction of the optical axis (a vertical direction in FIG. 8).

The pitch distributions of the first and second relief patterns 201 and 202 are optimized to have a given lens function and a depth of recesses of a sawtooth cross sectional configuration is optimized such that the diffraction efficiency of first-order becomes maximum at a wavelength of $\lambda$=550 nm. In the present embodiment, a depth $d_1$ of the first relief pattern 201 is set to 7.90 µm and a depth $d_2$ of the second relief pattern 202 is set to 13.73 µm. Then, the parameter $\alpha$ defined by a ratio of $d_2/d_1$ becomes equal to about 1.74. Outermost surfaces 301 and 302 of the element are formed to be flat and anti-reflecting coatings are applied on these outermost surfaces.

Figure 9:
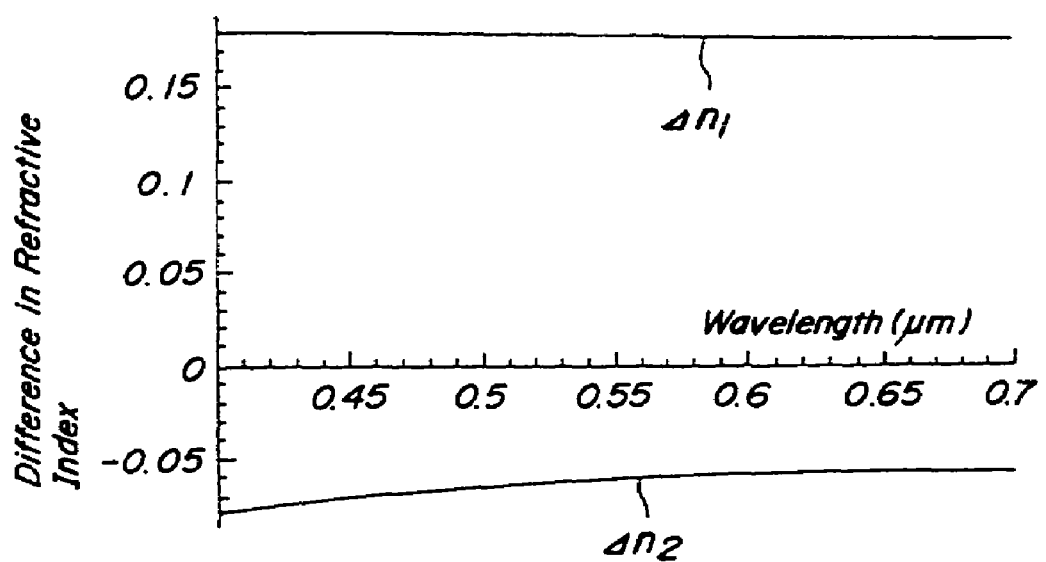
FIG. 9 is a graph representing wavelength dependencies of differences in refractive index between successive optical regions of the first embodiment.

FIG. 9 is a graph showing a wavelength dependency of $\Delta n_1$ expressed by the equation (10) and a wavelength dependency of $\Delta n_2$ represented by the equation (11). The wavelength dependencies are shown for a whole visible light range. As can be easily seen from FIG. 9, the difference in refractive index $\Delta n_1$ between LaL14 (first optical region 101) and the UV curable resin (second optical region 102) is positive over a whole visible range, because the refractive index of LaL14 is higher than that of the UV curable resin. Moreover, an Abbe's number of LaL14 is relatively close to that of the UV curable resin, and thus the difference in refractive index $\Delta n_1$ is slightly decreased in accordance with an increase in a wavelength $\lambda$. On the other hand, the difference in refractive index $\Delta n_2$ between the UV curable resin (second optical region 102) and the polycarbonate (third optical region 103) is negative over a whole visible range, because the refractive index of polycarbonate is higher than that of the UV curable resin. Therefore, the difference in refractive index $\Delta n_2$ becomes increased relatively largely in accordance with an increase in a wavelength $\lambda$.

In the present embodiment, $\alpha$ is selected to be such a positive value that $\alpha\Delta n_2$ does not exceed $\Delta n_1$ as can be understood from the graph shown in FIG. 9. Therefore, a wavelength dependency of the term of the difference in refractive index $N(\lambda)$ in the equation (15) is increased in accordance with an increase in a wavelength $\lambda$. Then, $\lambda$ in the denominator in the equation (13) is advantageously canceled by the term $N(\lambda)$, and thus a wavelength dependency of the phase amplitude is reduced. Therefore, the wavelength dependency of the diffraction efficiency is decreased.

FIG. 10 shows wavelength dependencies of the diffractive lens of the present embodiment and a known diffractive lens. In FIG. 10, a solid curve denotes the wavelength dependency of the diffractive lens of the present embodiment, and a broken curve represents the wavelength dependency of the known diffractive lens. In the known diffractive lens, a brazed pattern is formed on a LaL14 substrate in such a manner that a first-order diffraction efficiency becomes maximum at a wavelength of 510 nm. As can be easily understood, according to the invention, the wavelength dependency of phase amplitude is efficiently reduced.

FIG. 11 shows wavelength dependencies of diffraction efficiency of the present embodiment (solid curve) and the known diffractive lens (broken curve). Also as can be understood from FIG. 11, in the diffractive lens according to the invention, the wavelength dependency of diffraction efficiency is corrected very well as compared with the known diffractive lens.

As explained above, in the diffractive lens of the present embodiment, it is possible to obtain a high diffraction efficiency over a whole visible wavelength range, and therefore it is possible to avoid effectively undesired flare and ghost. The diffractive lens of the present embodiment may be advantageously utilized in an image pick-up device such as camera.

As shown in FIGS. 10 and 11, in the diffractive lens of the present embodiment, a wavelength at which the first-order diffraction efficiency becomes 100% differs from that of the known diffractive lens. This is due to the fact that a wavelength for optimization is selected such that the diffraction efficiency is balanced over a whole wavelength range to be used. In the diffractive lens of the present embodiment, the optimized wavelength is 550 nm, while the optimized wavelength of the known diffractive lens is 510 nm.

In the present embodiment, the wavelength dependency of diffraction efficiency on a shorter wavelength side is reduced much more effectively than that on a longer wavelength side. Therefore, it is preferable to set the optimized wavelength at a longer wavelength side. In this case, it is preferable the set the optimizing wavelength to a value within a range of ±10% with respect to a center wavelength of the wavelength range to be used. The wavelength range for the image pick-up optical system is generally set to 400-700 nm.

Furthermore, in the present embodiment, the second optical region 102 is made of the UV curable resin, and thus it is possible to manufacture the diffractive lens in a very simple manner by forming the first and second relief patterns 201 and 202 in free surfaces of the first and third optical regions 101 and 103, respectively and then by cementing these optical regions by means of the UV curable resin serving as an adhesive. In this manner, the diffractive lens of the present embodiment can be manufactured at a low cost.

It should be noted that the above mentioned merit can be obtained most effectively when the second optical region 102 is made of the UV curable resin, but a similar advantage can be attained when the second optical region 102 is made of a plastic material.

Furthermore, in case of stacking the first and second relief patterns 201 and 202, moire fringe may be utilized for aligning these patterns. That is to say, when these patterns are aligned in such a manner that the moire fringe does not produced, the corresponding portions of these patterns can be precisely aligned.

Figure 12:
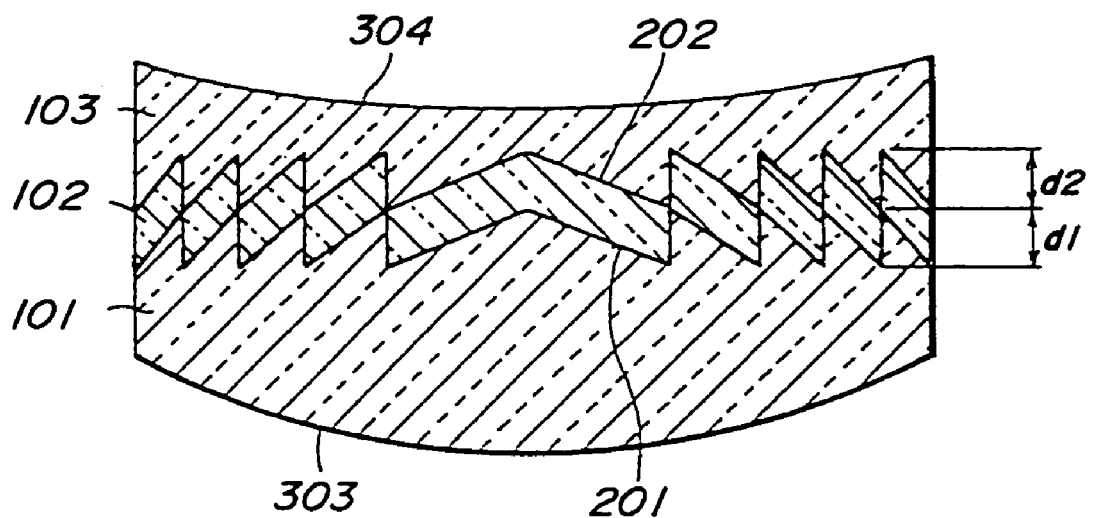
FIG. 12 is a cross sectional view showing a modification of the first embodiment shown in FIG. 8.

FIG. 12 shows a modification of the first embodiment. In this diffractive lens, one of the outermost surfaces 301 is shaped into a curve having a positive refractive power and the other outermost surface 304 is curved to have a negative refractive power. The remaining structure of this alternative embodiment is identical with the embodiment illustrated in FIG. 8. Anti-reflection coatings are applied on the outermost surfaces 303 and 304.

The diffractive lens of the present embodiment has a power due to the diffraction and a power due to the refraction, and thus can have a relatively high power. The wavelength dispersion (Abbe's number) of the diffractive power and that of the refractive power appear in opposite signs, so that the wavelength dispersions are canceled and a chromatic aberration can be corrected. In the embodiment illustrated in FIG. 12, the outermost surfaces 303 and 304 have refractive powers having opposite signs, and therefore the diffractive lens can be an achromatic single lens in which the chromatic aberration is corrected to a secondary spectrum.

FIG. 13 depicts a second embodiment of the diffractive optical element according to the invention. The diffractive optical element of the present embodiment is a transmission type diffractive lens. A first optical region 104 is made of a fluorine-contained resin "sitop" (trade name) manufactured by ASAHI GLASS company (nd=1.34149, υd=93.8) manufactured and sold by OHARA company, a second optical region 105 is made of a UV curable resin (nd=1.52, υd=51.8), and a third optical region 106 is made of a polycarbonate (nd=1.58, υd=30.5). These optical regions are stacked one on the other. A first relief pattern 203 is formed in a boundary surface between the first and second optical regions 104 and 105, and a second relief pattern 204 is formed in a boundary surface between the second and third optical regions 105 and 106. The first and second relief patterns 203 and 204 have an identical pitch distribution and are aligned in a direction of an optical axis in such a manner that top and bottom portions of the first relief pattern are aligned with bottom and top portions of the second relief pattern viewed in the direction of the optical axis.

The pitch distribution of the first and second relief patterns 203 and 204 is optimized to have a given lens function and a depth of recesses of a sawtooth cross sectional configuration is optimized such that the diffraction efficiency of first-order becomes maximum at a wavelength of λ=550 nm. In the present embodiment, a depth $d_1$ of the first relief pattern 203 and a depth $d_2$ of the second relief pattern 204 have opposite signs, because the these patterns are arranged in a relation of up-side-down. The depth of the first relief patterns 203 is set to −9.2 μm and the depth of the second relief pattern 204 is set to 17.84 μm. Then, the parameter α defined by a ratio of $d_2/d_1$ becomes equal to about −1.94. Outermost surfaces 305 and 306 of the element are formed to be flat and anti-reflecting coatings are applied on these outermost surfaces.

Figure 14:
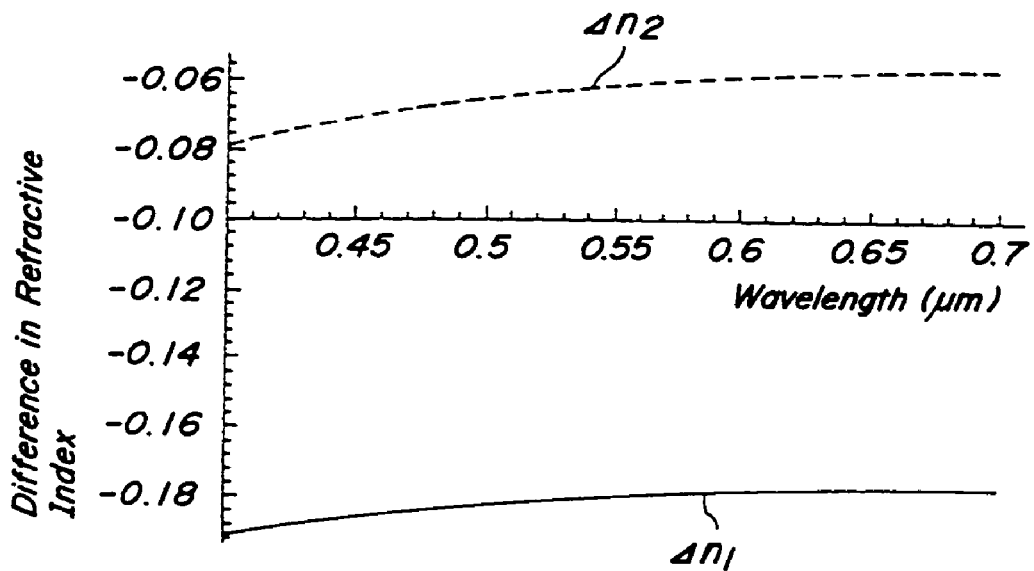
FIG. 14 is a graph representing wavelength dependencies of differences in refractive index between successive optical regions of the second embodiment.

FIG. 14 is a graph showing a wavelength dependency of $\Delta n_1$ expressed by the equation (10) and a wavelength dependency of $\Delta n_2$ represented by the equation (11) in the present embodiment. As can be seen from FIG. 14, the difference in refractive index $\Delta n_1$ between "sitop" (first optical region 104) and the UV curable resin (second optical region 105) is negative for a visible wavelength range, and similarly the difference in refractive index $\Delta n_2$ between the UV curable resin (second optical region 105) and the polycarbonate (third optical region 106) is negative for a visible wavelength range. Moreover, this structure is a combination of high refractive index and high dispersion and a low refractive index and low dispersion. Therefore, the differences in refractive index $\Delta n_1$ and $\Delta n_2$ (absolute values) are decreased in accordance with an increase in a wavelength λ.

In the present embodiment, α is selected to be such a negative value that an absolute value of $\alpha \Delta n_2$ does not exceed an absolute value of $\Delta n_1$, and therefore, a wavelength dependency of the term of the difference in refractive index N(λ) in the equation (15) is increased in accordance with an increase in a wavelength λ. Then, λ in the denominator in the equation (13) is advantageously canceled by the term N(λ), and thus a wavelength dependency of the phase amplitude is reduced and further the wavelength dependency of the diffraction efficiency is decreased.

Figure 15:
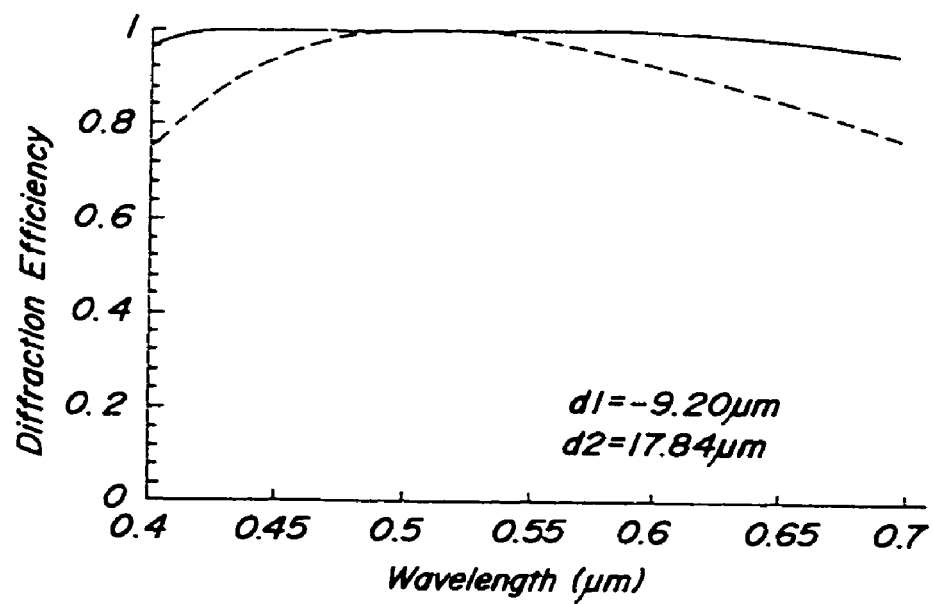
FIG. 15 is a graph representing wavelength dependencies of diffraction efficiency of the second embodiment and a known diffractive optical element.

FIG. 15 shows wavelength dependencies of diffraction efficiency of the diffractive lens of the present embodiment and a known diffractive lens. In FIG. 15, a solid curve denotes the wavelength dependency of diffraction efficiency of the diffractive lens of the present embodiment, and a broken curve represents the wavelength dependency of diffraction efficiency of the known diffractive lens. In the known diffractive lens, a brazed pattern is formed on a "sitop" substrate (optimizing wavelength is 510 nm). As can be seen from FIG. 15, in the diffractive lens according to the invention, the wavelength dependency of diffraction efficiency is effectively reduced as compared with the known diffractive lens.

As explained above, in the diffractive lens of the present embodiment, it is possible to obtain a high diffraction efficiency over a whole visible wavelength range, and therefore a problem of flare and ghost can be solved. The diffractive lens of the present embodiment may be advantageously utilized in an image pick-up device-such as camera.

In the present embodiment, the first and third optical regions 104 and 106 are made of plastic materials, and thus it is possible to manufacture the first and second relief patterns 203 and 204 in a very simple manner. surfaces of the first and third optical regions 101 and 103, respectively and then by cementing these optical regions by means of the UV curable resin serving as an adhesive. In this manner, the diffractive lens of the present embodiment can be manufactured at a low cost.

Further, since the second optical region 105 is made of the UV curable resin, the diffractive lens can be manufactured very easily by forming the first and second relief patterns 203 and 204 on the first and second optical regions 104 and 105, respectively and then by cementing these optical regions 104 and 105 by means of the UV curable resin. In this manner, the diffractive lens having the reduce wavelength dependency of diffraction efficiency can be manufactured easily at a low cost.

FIG. 16 shows a third embodiment of the diffractive optical element according to the invention. the embodiment is a double-focus type diffractive lens having. The layered structure of the present embodiment is same as that of the first embodiment. That is to say, a first optical region 101 is made of an optical glass LaL14 (nd=1.6968, υd=55.5) manufactured and sold by OHARA company, the second optical region 102 is made of a UV curable resin (nd=1.52, υd=52), and the third optical region 103 is made of a polycarbonate (nd=1.58, υd=30.5). A first relief pattern 205 is formed in a boundary surface between the first and second optical regions 101 and 102, and a second relief pattern 206 is formed in a boundary surface between the second and third optical regions 102 and 103. The first and second relief patterns 205 and 206 have an identical pitch distribution and are aligned in a direction of an optical axis in such a manner that top and bottom portions of the first relief pattern are aligned with bottom and top portions of the second relief pattern in the direction of the optical axis.

The pitch distribution of the first and second relief patterns 205 and 206 is optimized to have a given lens function. These relief patterns 205 and 206 are formed into a cross sectional shape having rectangular depressions and protrusions, a ratio of the depressions to the protrusions is equal to unity. A depth of the depressions and protrusions is optimized such that the diffraction efficiency of first-order becomes maximum at a wavelength of λ=600 nm. In the present embodiment, a depth $d_1$ of the first relief pattern 205 is set to 4.02 μm and a depth $d_2$ of the second relief pattern 206 is set to 7.03 μm. Then, the parameter α defined by a ratio of $d_2/d_1$ becomes equal to about 1.75. Outermost surfaces 301 and 302 of the element are formed to be flat and anti-reflecting coatings are applied on these outermost surfaces.

In the present embodiment, when ±1-order diffraction efficiencies become maximum, the phase amplitude corresponding to the equation (13) may be expressed as follows:

$$a(\lambda) = \frac{m_0}{2} \cdot \frac{\{n_1(\lambda) - n_2(\lambda)\} + \alpha\{n_2(\lambda) - n_3(\lambda)\}}{\{n_1(\lambda_0) - n_2(\lambda_0)\} + \alpha\{n_2(\lambda_0) - n_3(\lambda_0)\}} \cdot \frac{\lambda_0}{\lambda} \quad (21)$$

Then, the diffraction efficiency for m-order $\eta_m$ may be represented by the following equation (22):

$$\eta_m = \left\{ \frac{\sin(m\pi/2)}{m\pi/2} \cdot \cos\pi\left(a + \frac{m}{2}\right) \right\}^2 \quad (22)$$

The phase amplitude denoted by the equation (21) may be obtained by diving the right hand term in the equation (13) by two. This means that also in the present embodiment, the wavelength dependency of phase amplitude can be reduced by the same function as that of the first embodiment.

FIG. 17 shows the wavelength dependency of ±1-order diffraction efficiency of the diffractive lens of the present embodiment (solid curve) and a wavelength dependency of a known diffractive lens in which a rectangular phase grating is formed in a LAL14 substrate (broken curve). From the graph shown in FIG. 17, it is apparent that according to the invention, the wavelength dependency of diffraction efficiency is corrected very well. The wavelength dependency of diffraction efficiency is corrected over a whole visible wavelength range, and thus the diffractive lens of the present embodiment is preferably used as a double-focus optical system for a visible wavelength range.

In the above mentioned first and second embodiments, the first and second relief patterns are formed to have the sawtooth cross sectional configuration, and in the third embodiment, the first and second relief patterns are shaped to have the rectangular cross sectional configuration, However, according to the invention, the cross sectional configuration of the first and second relief patterns is not restricted to these configurations, but any other configuration may be applied.

FIG. 18 illustrates a fourth embodiment of the diffractive optical element according to the invention. the diffractive optical element of the present embodiment is formed as a transmission type diffractive lens. A first optical region 107 is made of an acrylic resin (nd=1.49, υd=57.7), and a second optical region 108 is made of a polycarbonate (nd=1.58, υd=30.5). These optical regions are stacked one on the other. In the present embodiment, the third optical region is constituted by the air surrounding the first and second optical regions 107 and 108. A first relief pattern 207 is formed in a boundary surface between the first and second optical regions 107 and 108, and a second relief pattern 208 is formed in a boundary surface between the second optical region 108 and the air, i.e. the third optical region. That is to say, the second relief pattern 208 is formed in a free surface of the second optical region 108. The first and second relief patterns 207 and 208 have an identical pitch distribution and are aligned in a direction of an optical axis in such a manner that top and bottom portions of the first relief pattern are aligned with bottom and top portions of the second relief pattern viewed in the direction of the optical axis. In the present embodiment, the top portions of the first relief pattern 207 are brought into contact with the bottom portions of the second relief pattern 208.

The pitch distribution of the first and second relief patterns 207 and 208 is optimized to have a given light collimating function and a depth of recesses of a sawtooth cross sectional configuration is optimized such that the diffraction efficiency of first-order becomes maximum at a wavelength of λ=550 nm. In the present embodiment, a depth $d_1$ of the first relief pattern 207 is 15.6 μm and a depth $d_2$ of the second relief pattern 208 is 3.34 μm. Therefore, the parameter α defined by a ratio of $d_2/d_1$ is equal to about 0.22.

In the present embodiment, the third optical region is formed by the atmosphere surrounding the optical element, practically the air having a refractive index of 1. Therefore, the wavelength dependency of diffraction efficiency can be corrected by the same function as the previous embodiments. Particularly, the third optical region has a very low refractive index, and thus a difference in refractive index between the second optical region 108 and the third optical region $\Delta n_2$ is sufficiently large. Then, a depth of the second relief pattern 208 can be relatively small. Therefore, the diffractive lens of the present invention can be thin, and the pitch of the relief patterns can be small.

In FIG. 19, a solid curve denotes the wavelength dependency of diffraction efficiency of the diffractive lens of the present embodiment and a broken curve shows a wavelength dependency of diffraction efficiency of a known diffractive lens in which a brazed pattern is formed in an acrylic resin substrate (optimizing wavelength λ=510 nm). From the graph shown in FIG. 19, it is apparent that also in the present embodiment, the wavelength dependency of diffraction efficiency is corrected very well.

FIG. 20 shows a fifth embodiment of the diffractive optical element according to the second aspect of the invention. The diffractive optical element of the present embodiment is formed as a reflection type diffractive optical element. A first optical region 111 is made of an aluminum, a second optical region 112 is made of a polycarbonate (nd=1.58, υd=30.5), and a third optical region 113 is made of an acrylic resin (nd=1.49, υd=57.5). These optical regions are stacked one on the other. A first relief pattern 211 is formed in a boundary surface between the first and second optical regions 111 and 112, and a second relief pattern 212 is formed in a boundary surface between the second optical region 112 and the third optical region 113. The first and second relief patterns 211 and 212 have an identical pitch distribution and are aligned in a direction of an optical axis in such a manner that top and bottom portions of the first relief pattern are aligned with bottom and top portions of the second relief pattern viewed in the direction of the optical axis. In the present embodiment, the first and second relief patterns 211 and 212 are formed to overlap with each other, and thus a distance $d_3$ between these relief patterns has a negative value.

The first and second relief patterns 211 and 212 are formed into a sawtooth cross sectional configuration having identical pitches and a depth of recesses of the sawtooth cross sectional configuration is optimized such that the diffraction efficiency of first-order becomes maximum at a wavelength of λ=550 nm. In the present embodiment, a depth $d_1$ of the first relief pattern 211 is 0.53 μm and a depth $d_2$ of the second relief pattern 212 is 6.04 μm. Therefore, the parameter α defined by a ratio of $d_2/d_1$ is equal to about 11.40.

In the present embodiment, the first optical region 111 is made of a reflecting material, i.e. aluminum, and therefore light being made incident from an incident surface 311 is reflected by the first relief pattern 212. Therefore, the diffractive optical element of the present embodiment operates as a reflection type diffractive optical element. The wavelength dependency of diffraction efficiency can be explained by the equation (14). This equation (14) may be derived by setting zero the refractive index of the first optical region in the equation (13) to zero, said equation (13) representing the phase amplitude of the transmission type diffractive optical element. Therefore, the wavelength dependency of diffraction efficiency can be corrected by the same function as the previous embodiments. Particularly, the third optical region has a very low refractive index, and thus a difference in refractive index between the second optical region 108 and the third optical region $\Delta n_2$ is sufficiently large. Then, a depth of the second relief pattern 208 can be relatively small. Therefore, the diffractive lens of the present invention can be thin, and the pitch of the relief patterns can be small.

In FIG. 21, a solid curve denotes the wavelength dependency of diffraction efficiency of the reflection type diffractive optical element of the present embodiment and a broken curve shows a wavelength dependency of diffraction efficiency of a known reflection type diffractive optical element in which a reflection type brazed grating is formed (optimizing wavelength λ=510 nm). From FIG. 21, it can be understood that in the present embodiment, the wavelength dependency of diffraction efficiency is corrected very well as compared with the known diffractive optical element.

Figure 24:
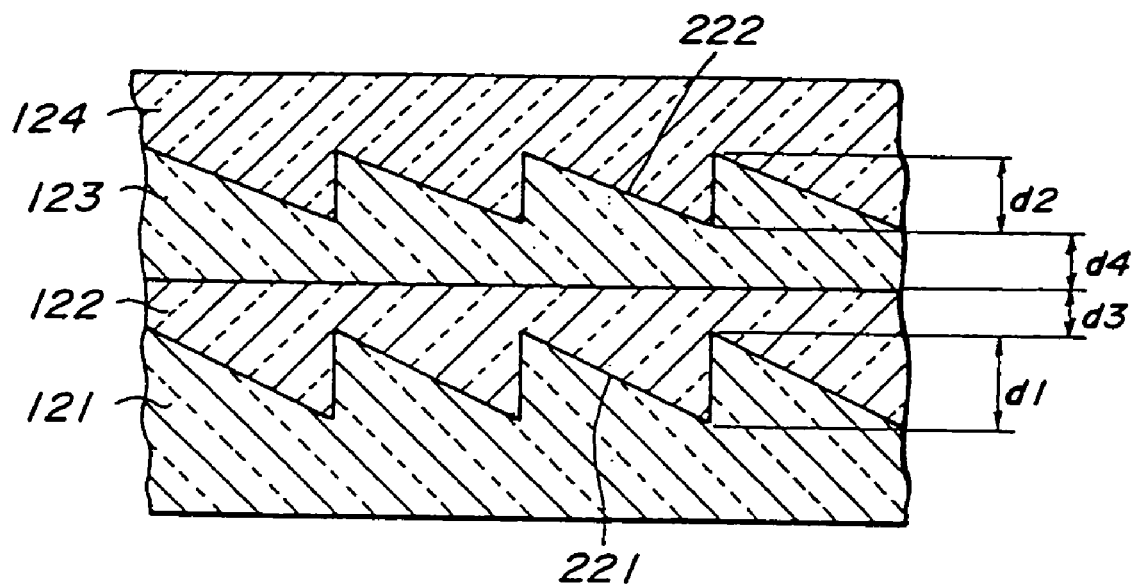
FIG. 24 is a schematic cross sectional view depicting a principal structure of the diffractive optical element according to a fourth aspect of the invention.

FIG. 24 is a schematic cross sectional view illustrating a principal structure of the diffractive optical element according to the fourth aspect of the invention. The diffractive optical element comprises first, second, third and fourth optical regions 121, 122, 123 and 124, which are stacked one on the other successively, a first relief pattern 221 formed in a boundary surface between the first and second regions 121 and 122, and a second relief pattern 222 is formed in a boundary surface between the third and fourth optical regions 123 and 124. The first, second, third and fourth optical regions 121-124 are made of at least three different kinds of optical materials which are substantially transparent to light within a wavelength range to be used. The first and second optical regions 121 and 122 are made of different optical materials, and the third and fourth optical regions 123 and 124 are made of different optical materials. Refractive indices of these optical regions 121-124 are represented by $n_1$, $n_2$, $n_3$ and $n_2$, respectively.

The first and second relief patterns 221 and 222 are formed to have a sawtooth cross sectional configuration having the same pitch distribution. A depth of the first sawtooth relief pattern 221 is $d_1$, and a depth of the second sawtooth relief pattern 222 is $d_2$, a distance between a top of the first relief pattern 221 and a boundary surface between the second and third optical regions 122 and 123 is $d_3$, and a distance between this boundary surface and bottom portions of the second relief pattern 222 is $d_4$.

In the diffractive optical element shown in FIG. 24, light is made incident upon the diffractive optical element along an optical axis thereof which is a vertical direction in a plane of the drawing of FIG. 24. Then, the incident light is subjected to a phase modulation by the first and second relief patterns 221 and 222. In this case, a phase amplitude $a_1(\lambda)'$ of the first relief pattern 221 may be expressed as follows:

$$a_1(\lambda) = \frac{\Delta n_1(\lambda)}{\lambda} d_1; \quad \Delta n_1(\lambda) = n_1(\lambda) - n_2(\lambda) \quad (23)$$

A phase amplitude $a_2(\lambda)$ of the second relief pattern 222 may be represented in the following manner:

$$a_2(\lambda) = \frac{\Delta n_2(\lambda)}{\lambda} d_2; \quad \Delta n_2(\lambda) = n_3(\lambda) - n_4(\lambda) \qquad (24)$$

Now it is assumed that the first and second relief patterns 221 and 222 are constructed into a single integral body and the incident light is modulated substantially at the same time. Then, a total phase amplitude $a(\lambda)$ which characterizes the phase shift function may be expressed by the following equation:

$$a(\lambda) = a_1(\lambda) + a_2(\lambda) = \frac{\Delta n_1(\lambda) + \alpha \Delta n_2(\lambda)}{\lambda} d_1 \qquad (25)$$

When a depth of the sawtooth relief patterns 221 and 222 is optimized such that a diffraction efficiency of $m_0$-order becomes 100% for a specific wavelength $\lambda_0$, $a(\lambda_0)=m_0$ is obtained. Then, the following equation (26) may be obtained:

$$a(\lambda) = m_0 \cdot \frac{\Delta n_1(\lambda) + \alpha \Delta n_2(\lambda)}{\Delta n_1(\lambda_0) + \alpha \Delta n_2(\lambda_0)} \cdot \frac{\lambda_0}{\lambda} \qquad (26)$$

wherein $\alpha$ is a value defined by a ratio of the depth $d_2$ of the second relief pattern 222 to the depth $d_1$ of the first relief pattern 221 as follows:

$$\alpha = \frac{d_2}{d_1} \qquad (27)$$

As expressed by the equation (25), the phase amplitude $a(\lambda)$ of the diffractive optical element according to the fourth aspect of the invention is given by a sum of the phase amplitude $a_1(\lambda)$ of the first relief pattern 221 and the phase amplitude $a_2(\lambda)$ of the second relief pattern 222, and a wavelength dependency of the phase amplitude $a(\lambda)$ of the diffractive optical element is dependent upon the parameter $\alpha$ defined by the equation (27). Here, as can be seen from the equation (26), the parameter $\alpha'$ may be determined at will in regardless with the optimization of the diffraction efficiency for the specific wavelength $\lambda_0$.

In the diffractive optical element illustrated in FIG. 24, the first, second, third and fourth optical regions 121, 122, 123 and 124 are made of different optical materials which are substantially transparent to light within a given wavelength to be used, and the differences in refractive index $\Delta n_1'$ and $\Delta n_2$ have different wavelength dependencies from each other. Therefore, by changing the parameter $\alpha$, the wavelength dependency of the phase amplitude $a(\lambda)$ defined by the equation (26) can be adjusted in various ways.

According to the fourth aspect of the invention, only the wavelength dependency of the diffraction efficiency at the specific wavelength $\lambda_0$ can be exclusively adjusted or controlled in a favorable manner by suitably setting the ratio of the depth of the second relief pattern to the depth of the first relief pattern, i.e. the parameter $\alpha$, while a diffractive efficiency at the specific wavelength $\lambda_0$ can be maintained to be optimum. In general, it is possible to optimize the wavelength dependency of diffraction efficiency by making the depths different from each other ($\alpha \neq 1$). However, according to the invention, it is also possible to optimize the wavelength dependency of diffraction efficiency by suitably combining the optical materials of the first, second, third and fourth optical regions even under a condition that $\alpha=1$.

Figure 25:
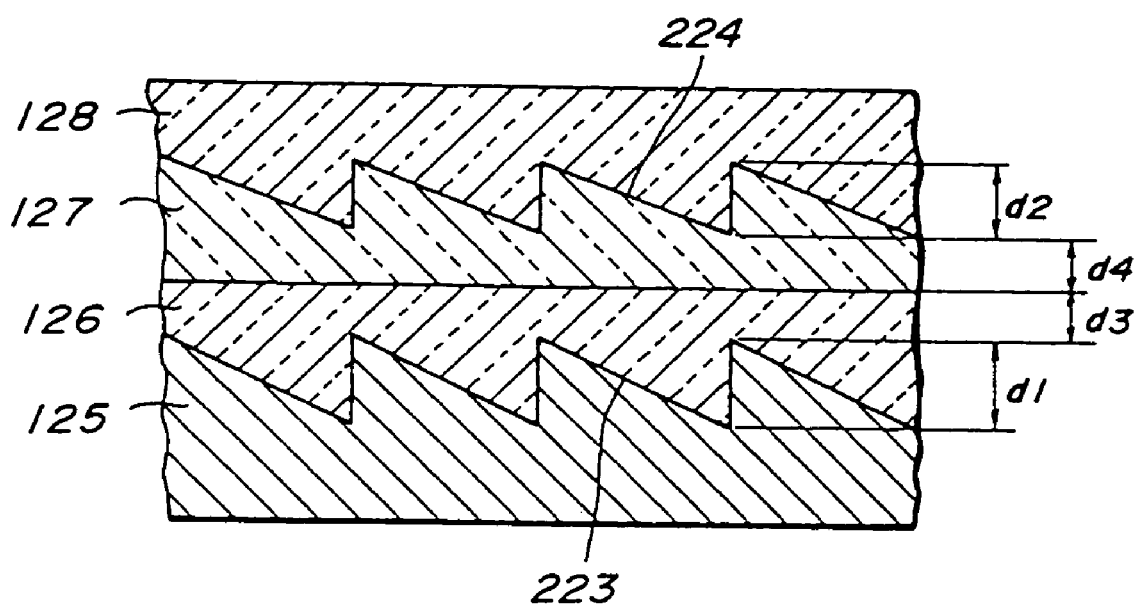
FIG. 25 is a schematic cross sectional view depicting a principal structure of the diffractive optical element according to a fifth aspect of the invention.

FIG. 25 is a schematic cross sectional view illustrating the diffractive optical element according to the fifth aspect of the invention. The diffractive optical element comprises first, second, third and fourth optical regions 125, 126, 127 and 128 which are stacked one on the other successively, a first relief pattern 223 formed in a boundary surface between the first and second optical regions 125 and 126, and a second relief pattern 224 formed in a boundary surface between the third and fourth optical regions 127 and 128. The first optical region 125 is made of a material which reflects light within a wavelength range to be used. The second, third and fourth optical regions 126, 127 and 128 are made of at least three different kinds of optical materials which are substantially transparent to light within the wavelength range to be used. The third and fourth optical regions 127 and 128 are made of different optical materials.

The second, third and fourth optical regions 126, 127 and 128 have refractive indices $n_2$, $n_3$ and $n_4$, respectively.

The first and second relief patterns 223 and 224 are formed to have a sawtooth cross sectional configuration having the same pitch distribution. A depth of the first sawtooth relief pattern 223 is $d_1$ and a depth of the second sawtooth relief pattern 224 is $d_2$. Further, a distance from top portions of the first relief pattern 223 to a boundary surface between the second and third optical regions 126 and 127 is $d_3$, and a distance from said boundary surface to bottom portions of the second relief pattern 224 is $d_4$.

In FIG. 25, light is made incident upon the diffractive optical element from the side of the fourth optical region 128 and is subjected to the phase modulation by the second and first relief patterns 224 and 223 in this order. The first relief pattern 223 is formed on the surface of the first optical region 125 made of the material which reflects the light, and thus the light is reflected by the first relief pattern 223. In this manner, the diffractive optical element of this embodiment serves as a reflection type diffractive optical element.

In the present diffractive optical element, it is also assumed that the first and second relief patterns 223 and 224 are constructed as a single integral body, so that the light impinging upon the diffractive optical element is modulated substantially simultaneously. Then, a phase amplitude of the diffractive optical element may be expressed by the following equation (28) when the depths of the first and second relief patterns 223 and 224 are set in such a manner that the diffraction efficiency of $m_0$ for a specific wavelength $\lambda_0$ becomes 100%.

$$a(\lambda) = m_0 \cdot \frac{-n_2(\lambda) + \alpha\{n_3(\lambda) - n_4(\lambda)\}}{-n_2(\lambda_0) + \alpha\{n_3(\lambda_0) - n_4(\lambda_0)\}} \cdot \frac{\lambda_0}{\lambda} \qquad (28)$$

This equation (28) corresponds to the equation (26) of the structure shown in FIG. 24 first embodiment and the parameter $\alpha$ is a ratio of the depth $d_2$ of the second relief pattern 224 to the depth $d_1$ of the first relief pattern 223 as defined by the equation (27).

The above mentioned equation (28) may be obtained by setting the refractive index of the first optical region 14 in the equation (26) of the structure shown in FIG. 24 to zero. That is to say, also in the present structure, the phase amplitude can be expressed by the parameter α which may take an arbitrary value. Therefore, also in the present diffractive optical element, by suitably setting the parameter α, it is possible to control only the wavelength dependency of diffraction efficiency, while keeping the diffraction efficiency for the specific wavelength optimum like as the diffractive optical element shown in FIG. 24.

In the fourth aspect of the invention, in order to further reduce the wavelength dependency of diffraction efficiency, it is necessary to decrease the wavelength dependency of phase amplitude a(λ) defined by the equation (25) or (26). For instance, in the equation (26), the wavelength dependency of phase amplitude a(λ) is determined by the two terms including the differences in refractive index $\Delta n_1(\lambda)$ and $\Delta n_2(\lambda)$ in the numerator and λ in the denominator. Therefore, in order to reduce this wavelength dependency, it is preferable to select the optical materials and said ratio of the depths in such a manner that an absolute value of a sum of the two differences in refractive index ΔN(λ) is increased in accordance with an increase in the wavelength λ. Said absolute value of a sum of the two differences in refractive index ΔN(λ) can be expressed by the following equation (29):

$$\Delta N(\lambda) = |\Delta n_1(\lambda) + \alpha \Delta n_2(\lambda)| \quad (29)$$

Then, the numerator and denominator in the equation (26) have opposite functions for the wavelength dependency of diffraction efficiency, and thus it is possible to realize the diffractive optical element having a further reduced wavelength dependency of diffraction efficiency. The equation (26) is defined for the structure according to the fourth aspect of the invention, but the equation (28) may be obtained by setting n1(λ)=0 in the equation (26), so that the explanation about the equation (29) may be also applied to the fifth aspect of the present invention.

In case of actually selecting optical materials for the diffractive optical element, there are many optical materials, in which an absolute value of the difference in refractive index Δn(λ) becomes decreased in accordance with an increase in the wavelength λ. This does not result in the desired wavelength dependency. That is to say, many available optical materials are distributed from a range of high refractive index and high dispersion to a range of low refractive index and low dispersion. In the fourth and fifth aspects of the invention, it is effective to setting a sign, i.e. positive or negative of the ratio of depths of the grooves of the relief patterns such that the two terms including the difference in refractive index are canceled each other. Then, the wavelength dependency opposite to the desired property can be canceled out. In this manner, by combining optical materials having high refractive index and high dispersion with optical materials having low refractive index and low dispersion, the wavelength dependency of diffraction efficiency can be further reduced, and such a combination can be easily realized.

The sign of the ratio α can be determined by a manner of arranging the first and second relief patterns. When the first and second relief patterns are arranged such that tops and bottoms of the first pattern are aligned with tops and bottoms of the second pattern in the direction of the optical axis as illustrated in FIG. 26, the ratio α is positive. When the first and second relief patterns are arranged such that tops and bottoms of the first pattern are aligned with bottoms and tops of the second pattern as shown in FIG. 31, it is possible to obtain a negative ratio α.

In The forth to sixth aspects of the invention, no relief pattern is formed in the boundary surface between the second and third optical regions, and thus these optical regions may be formed by the same optical material. This is very advantageous in view of manufacture.

In the fourth to sixth aspects of the invention, the fourth optical region may be formed by an atmosphere surrounding the diffractive optical element. In general, the diffractive optical element is placed in the air, the fourth optical region may be made of the air. In this case, a difference in refractive index between the third and fourth optical regions can be very large, and thus a necessary depth of the relief pattern may be small and a diffractive optical element having a superior property can be realized.

In general, the diffractive optical element may be classified into a thick type and a thin type. In case realizing a diffractive optical element for an image focusing optical system using light rays within a wavelength range, it is preferable to use the thin type one which has a relatively low incident angle dependency as well as a relatively low wavelength dependency. It has been well known to use a parameter Q characterizing a thickness of the diffractive optical element, said parameter being defined as follows:

$$Q = \frac{2\pi \lambda D}{n_0 T^2} \quad (30)$$

In general, when Q<1, a diffractive optical element is classified into the thin type. In the above equation (30), T is a pitch of a periodic structure of a relief pattern and $n_0$ is an average refractive index of the periodic structure. In the present invention, it is also preferable to construct the diffractive optical element to satisfy the condition Q<1.

From the equation (30), it is understood that the parameter Q denoting the thickness of the diffractive optical element is dependent upon the wavelength λ. However, in order to keep a uniformity of the diffraction efficiency over a whole wavelength range to be used, it is sufficient that the above condition Q<1 is satisfied for a center wavelength within the whole wavelength range. Therefore, also in the present invention, it is preferable to construct the diffractive optical element such that the condition Q<1 is satisfied for a center wavelength. For instance, when the diffractive optical element is used for a visible light wavelength, the center wavelength may be set to a value within a range from 480 nm to 550 nm. Of course, it is much more preferable to construct the diffractive optical element to satisfy the condition Q<1 for the whole wavelength range.

The inventor has confirmed that when Q<0.1, the relief type diffractive optical element can have characteristics of the thin type in an efficient manner. Therefore, according to the invention, it is preferable to construct the periodic structure to satisfy the condition Q<0.1.

In the embodiment shown in FIG. 24, the depth D and average refractive index $n_0$ of the periodic structure may be expressed as follows:

$$D = d_1 + d_2 + d_3 + d_4 \quad (31)$$

$$n_0 = \frac{d_1 \frac{n_1 + n_2}{2} + d_2 \frac{n_3 + n_4}{2} + d_3 n_2 + d_4 n_3}{d_1 + d_2 + d_3 + d_4} \quad (32)$$

In the embodiment shown in FIG. 25, the depth D and average refractive index $n_0$ of the periodic structure may be expressed as follows:

$$D = 2(d_1 + d_2 + d_3 + d_4) \quad (33)$$

$$n_0 = \frac{d_1 \frac{n_2}{2} + d_2 \frac{n_3 + n_4}{2} + d_3 n_2 + d_4 n_3}{d_1 + d_2 + d_3 + d_4} \quad (34)$$

It should be noted that the diffractive optical element according to the invention is particularly suitable for a wavelength range wider than a given amount. In conventional diffractive optical element in which the diffraction efficiency is optimized for an arbitrary wavelength $\lambda$, a width of a wavelength range in which a variation of the diffraction efficiency can be neglected is about 5%. Therefore, the diffractive optical element according to the invention can be advantageously used for a wavelength range which is wider than 5% of a center wavelength $\lambda$.

The above explanation is described for a case in which the first, second and third optical regions are brought into contact with each other. However, this may be also applied to a diffractive optical element in which said optical regions are brought closer to each other by means of cementing layers provided between adjacent optical regions.

The diffractive optical element according to the invention may be used for general optical systems in which a plurality of wavelengths within a wavelength range are used, but the diffractive optical element according to the invention can be particularly advantageously used in a visible light image focusing optical system. That is to say, the diffractive optical elements according to the fourth to fifth aspects of the invention can be advantageously used also for the optical systems shown in FIGS. 22 and 23.

Now several embodiments of the diffractive optical element according to the fourth to sixth aspects of the invention will be explained in detail.

FIG. 26 illustrates a fifth embodiment of the diffractive optical element according to fourth aspect of the invention. The embodiment is a transmission type diffractive lens. A first optical region 131 is made of an optical glass LaL14 (nd=1.6968, υd=55.5) manufactured and sold by OHARA company, second and third optical regions 132 and 133 are made of a UV curable resin (nd=1.52, υd=52), and a fourth optical region 134 is made of a polycarbonate (nd=1.58, υd=30.5). These optical regions 131-134 are stacked one on the other. A first relief pattern 231 is formed in a boundary surface between the first and second optical regions 131 and 132, and a second relief pattern 232 is formed in a boundary surface between the third and fourth optical regions 133 and 134. The first and second relief patterns 231 and 232 have an identical pitch distribution and are aligned in a direction of an optical axis in such a manner that top and bottom portions of the first relief pattern are aligned with top and bottom portions of the second relief pattern viewed in the direction of the optical axis.

The pitch distributions of the first and second relief patterns 231 and 232 are optimized to have a given lens function and a depth of recesses of a sawtooth cross sectional configuration is optimized such that the diffraction efficiency of first-order becomes maximum at a wavelength of $\lambda$=550 nm. In the present embodiment, a depth $d_1$ of the first relief pattern 231 is set to 7.90 μm and a depth $d_2$ of the second relief pattern 232 is set to 13.74 μm. Then, the parameter $\alpha$ defined by a ratio of $d_2/d_1$ as shown by the equation (27) becomes equal to about 1.74. Outermost surfaces 321 and 322 of the diffractive optical element are formed to be flat and anti-reflecting coatings are applied on these outermost surfaces.

FIG. 27 is a graph showing a wavelength dependency of $\Delta n_1$ expressed by the equation (23) and a wavelength dependency of $\Delta n_2$ represented by the equation (24). The wavelength dependencies are shown for a whole visible light range. As can be understood from FIG. 27, the difference in refractive index $\Delta n_1$ between LaL14 (first optical region 131) and the UV curable resin (second optical region 132) is positive over a whole visible range, because the refractive index of LaL14 is higher than that of the UV curable resin. Moreover, an Abbe's number of LaL14 is relatively close to that of the UV curable resin, and thus the difference in refractive index $\Delta n_1$ is slightly decreased in accordance with an increase in a wavelength $\lambda$. On the other hand, the difference in refractive index $\Delta n_2$ between the UV curable resin (third optical region 133) and the polycarbonate (fourth optical region 134) is negative over a whole visible range, because the refractive index of polycarbonate is higher than that of the UV curable resin. Therefore, the difference in refractive index $\Delta n_2$ increases relatively largely in accordance with an increase in a wavelength $\lambda$.

In the present embodiment, $\alpha$ is selected to be such a positive value that $\alpha \Delta n_2$ does not exceed $\Delta n_1$ as can be understood from the graph shown in FIG. 27. Therefore, a wavelength dependency of the term of the difference in refractive index $N(\lambda)$ in the equation (29) is increased in accordance with an increase in a wavelength $\lambda$. Then, $\lambda$ in the denominator in the equation (26) is advantageously canceled by the term $N(\lambda)$, and thus a wavelength dependency of phase amplitude is reduced and further the wavelength dependency of diffraction efficiency is decreased.

FIG. 28 shows wavelength dependencies of diffractive lens of the present embodiment and a known diffractive lens. In FIG. 28, a solid curve expresses the wavelength dependency of diffraction efficiency of the diffractive lens of the present embodiment, and a broken curve represents the wavelength dependency of diffraction efficiency of the known diffractive lens. In the known diffractive lens, a brazed pattern is formed on a LaL14 substrate in such a manner that a first-order diffraction efficiency becomes maximum at a wavelength of 510 nm. As can be easily understood, according to the invention, the wavelength dependency of phase amplitude is efficiently reduced by optimizing the value of $\alpha$.

FIG. 29 shows wavelength dependencies of diffraction efficiency of the present embodiment (solid curve) and the known diffractive lens (broken curve). Also as can be understood from FIG. 29, in the diffractive lens according to the invention, the wavelength dependency of diffraction efficiency is corrected very well as compared with the known diffractive lens.

As explained above, in the diffractive lens of the present embodiment, it is possible to obtain a high diffraction efficiency over a whole visible wavelength range, and therefore it is possible to avoid effectively undesired flare and ghost. The diffractive lens of the present embodiment may be advantageously utilized in an image pick-up device such as camera.

As shown in FIGS. 29 and 30, in the diffractive lens of the present embodiment a wavelength at which the diffraction efficiency of first-order becomes 100% differs from that of the known diffractive lens. This is due to the fact that an optimizing wavelength is selected such that the diffraction efficiency is well balanced over a whole wavelength range to be used. In the diffractive lens of the present embodiment, the optimizing wavelength is 550 nm, while the optimizing wavelength of the known diffractive lens is 510 nm.

In the present embodiment, the wavelength dependency of diffraction efficiency on a shorter wavelength side is reduced much more effectively than that on a longer wavelength side. Therefore, it is preferable to set the optimizing wavelength at a longer wavelength side. In this case, it is preferable to set the optimizing wavelength to a value within a range of ±10% with respect to a center wavelength of the wavelength range to be used. The wavelength range for the image pick-up optical system is generally set to 400-700 nm.

Furthermore, in the present embodiment, the second and third optical regions 132 and 133 are made of the UV curable resin, and thus it is possible to manufacture the diffractive lens in a very simple manner by forming the first and second relief patterns 231 and 232 in free surfaces of the first and fourth optical regions 131 and 134, respectively and then by cementing these optical regions by means of the UV curable resin constituting the second and third optical regions 132 and 133. In this manner, the diffractive lens of the present embodiment can be manufactured at a low cost.

The above mentioned merit can be obtained most effectively when the second and third optical regions 132 and 233 are made of the UV curable resin, but a similar advantage can be attained when the second and third optical regions 132 and 133 are made of a plastic material.

Furthermore, in case of stacking the first and second relief patterns 201 and 202, moire fringe may be utilized for aligning these patterns. That is to say, when these patterns are aligned in such a manner that the moire fringe is completely disappeared, the corresponding portions of these patterns can be precisely aligned.

FIG. 30 depicts modification of the six embodiment shown in FIG. 26. In this diffractive lens, one of the outermost surfaces 323 is shaped into a curve having a positive refractive power and the other outermost surface 324 is curved to have a negative refractive power. The remaining structure of this modified embodiment is identical with the embodiment illustrated in FIG. 26. Anti-reflection coatings are applied on the outermost surfaces 323 and 324.

The diffractive lens of the present embodiment has a power due to the diffraction and a power due to the refraction, and thus can have a relatively large power. The wavelength dispersion (Abbe's number) of the diffractive power and that of the refractive power appear in opposite signs, so that the wavelength dispersions are canceled and a chromatic aberration can be corrected. In the embodiment illustrated in FIG. 12, the outermost surfaces 323 and 324 have refractive powers having opposite signs, and therefore the diffractive lens can be an achromatic single lens in which the chromatic aberration is corrected to a secondary spectrum.

FIG. 31 shows a seventh embodiment of the diffractive optical element according to the fourth aspect of the invention. The diffractive optical element of the present embodiment is a transmission type diffractive lens. A first optical region 135 is made of a fluorine-contained resin "sitop" manufactured by ASAHI GLASS company (nd=1.34149, υd=93.8), second and third optical regions 136 and 137 are made of a UV curable resin (nd=1.52, υd=51.8), and a fourth optical region 138 is made of a polycarbonate (nd=1.58, υd=30.5). These optical regions are stacked one on the other. A first relief pattern 233 is formed in a boundary surface between the first and second optical regions 135 and 136, and a second relief pattern 234 is formed in a boundary surface between the third and fourth optical regions 137 and 138. The first and second relief patterns 233 and 234 have an identical pitch distribution and are aligned in a direction of an optical axis in such a manner that top and bottom portions of the first relief pattern 233 are aligned with bottom and top portions of the second relief pattern 234 viewed in the direction of the optical axis. That is to say, the first and second relief patterns 233 and 234 are arranged to be opposed to each other.

The pitch distribution of the first and second relief patterns 233 and 234 is optimized to have a given lens function and a depth of recesses of a sawtooth cross sectional configuration is optimized such that the diffraction efficiency of first-order becomes maximum at a wavelength of λ=550 nm. In the present embodiment, a depth $d_1$ of the first relief pattern 203 and a depth $d_2$ of the second relief pattern 204 have opposite signs, because the these patterns are arranged in a relation of up-side-down. The depth of the first relief patterns 233 is set to −9.20 μm and the depth of the second relief pattern 234 is set to 17.84 μm. Then, the parameter α defined by a ratio of $d_2/d_1$ becomes equal to about −1.94. Outermost surfaces 324 and 325 of the element are formed to be flat and anti-reflecting coatings are applied on these outermost surfaces.

Figure 32:
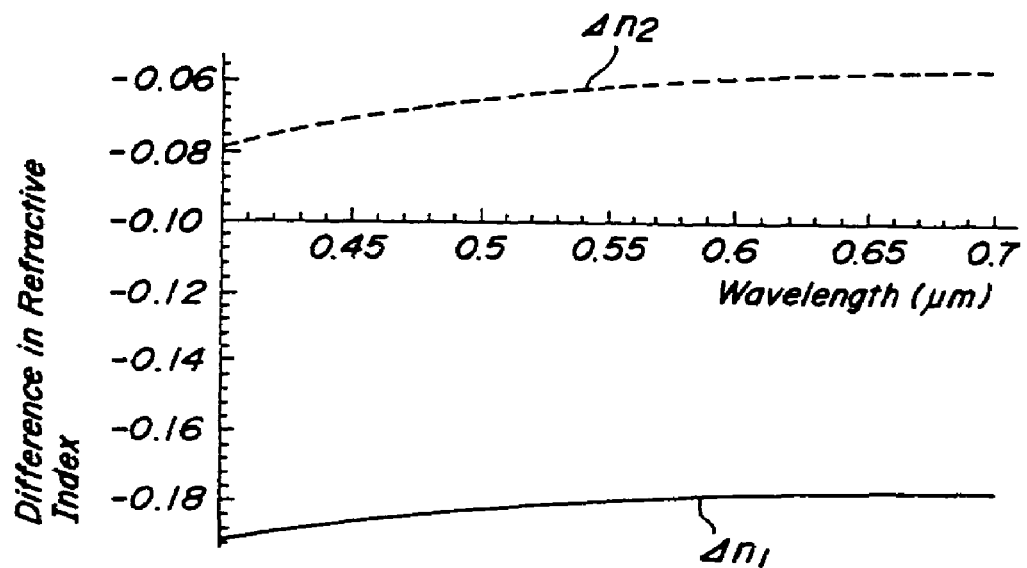
FIG. 32 is a graph representing wavelength dependencies of differences in refractive index between successive optical regions of the seventh embodiment.

FIG. 32 is a graph showing a wavelength dependency of $\Delta n_1$ expressed by the equation (23) and a wavelength dependency of $\Delta n_2$ represented by the equation (24) in the present embodiment. As can be seen from FIG. 32, the difference in refractive index $\Delta n_1$ between "sitop" (first optical region 135) and the UV curable resin (second optical region 136) is negative for a visible wavelength range, and similarly the difference in refractive index $\Delta n_2$ between the UV curable resin (third optical region 137) and the polycarbonate (fourth optical region 138) is negative for a visible wavelength range. Moreover, this structure is a combination of high refractive index and high dispersion and a low refractive index and low dispersion. Therefore, the differences in refractive index $\Delta n_1$ and $\Delta n_2$ (absolute values) are decreased in accordance with an increase in a wavelength λ.

In the present embodiment, α is selected to be such a negative value that an absolute value of $\alpha \Delta n_2$ does not exceed an absolute value of $\Delta n_1$, and therefore, a wavelength dependency of the term of the difference in refractive index N(λ) in the equation (29) is increased in accordance with an increase in a wavelength λ. Therefore, λ in the denominator in the equation (26) is effectively canceled by the term (λ), and thus a wavelength dependency of phase amplitude is reduced and further the wavelength dependency of diffraction efficiency is decreased.

Figure 33:
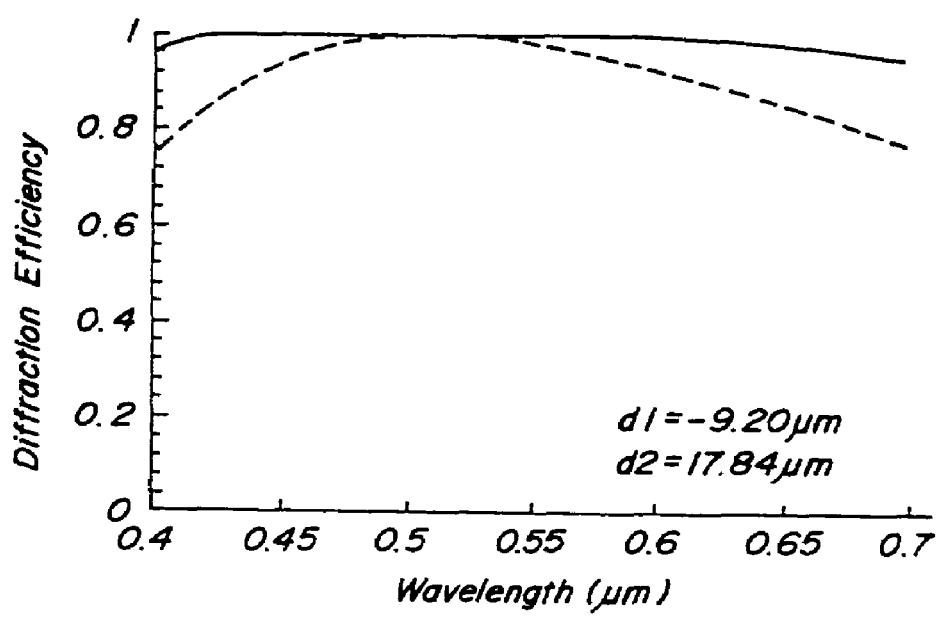
FIG. 33 is a graph denoting wavelength dependencies of diffraction efficiency of the seventh embodiment and a known diffractive optical element.

FIG. 33 shows wavelength dependencies of diffraction efficiency of the diffractive lens of the present embodiment and a known diffractive lens. In FIG. 33, a solid curve denotes the wavelength dependency of diffraction efficiency of the diffractive lens of the present embodiment, and a broken curve represents the wavelength dependency of diffraction efficiency of the known diffractive lens. In the known diffractive lens, a brazed pattern is formed on a "sitop" substrate (optimizing wavelength is 510 nm). As can be seen from FIG. 15, in the diffractive lens according to the invention, the wavelength dependency of diffraction efficiency is effectively reduced as compared with the known diffractive lens.

As explained above, in the diffractive lens of the present embodiment, it is possible to obtain a high diffraction efficiency over a whole visible wavelength range, and therefore a problem of flare and ghost hardly occur. The diffractive lens of the present embodiment may be advantageously utilized in an image pick-up device such as camera. Furthermore, the first and fourth optical regions 135 and 138 are made of plastic materials, and thus it is possible to manufacture the first and second relief patterns 233 and 234 in a very simple manner. Since the second and third optical regions 136 and 137 are made of the UV curable resin, the first and second relief patterns 233 and 234 formed on the surfaces of the first and fourth optical regions 135 and 138 can be cemented by means of the UV curable resin constituting the second and third optical regions 136 and 137. In this manner, the diffractive optical element having the reduced wavelength dependency of diffraction efficiency can be easily manufactured at a low cost.

Figure 34:
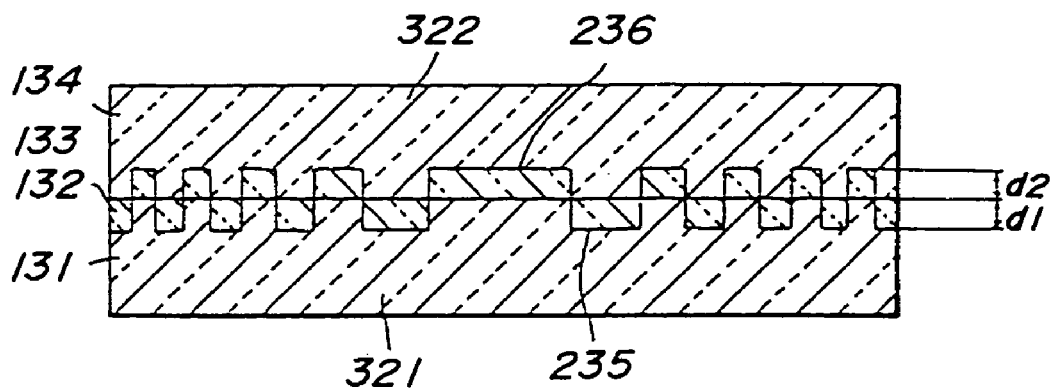
FIG. 34 is a cross sectional view showing a eighth embodiment of the diffractive optical element according to the invention.

FIG. 34 shows an eighth embodiment of the diffractive optical element according to the fourth aspect of the invention. The embodiment is a double-focus type diffractive lens. The layered structure of the present embodiment is same as that of the sixth embodiment shown in FIG. 26. That is to say, a first optical region 131 is made of an optical glass LaL14 (nd=1.6968, υd=55.5) manufactured and sold by OHARA company, second and third optical regions 132 and 133 are made of a UV curable resin (nd=1.52, υd=52), and a fourth optical region 134 is made of a polycarbonate (nd=1.58, υd=30.5). A first relief pattern 235 is formed in a boundary surface between the first and second optical regions 131 and 132, and a second relief pattern 236 is formed in a boundary surface between the third and fourth optical regions 133 and 134. The first and second relief patterns 235 and 236 have an identical pitch distribution and are aligned in a direction of an optical axis in such a manner that top portions of the first relief pattern 235 are brought into contact with bottom portions of the second relief pattern 236.

The pitch distribution of the first and second relief patterns 235 and 236 is optimized to have a given lens function. These relief patterns 235 and 236 are formed into a cross sectional shape having rectangular depressions and protrusions, a ratio of the depressions to the protrusions is equal to unity. A depth of the depressions and protrusions is optimized such that the diffraction efficiency of first-order becomes maximum at a wavelength of λ=600 nm. In the present embodiment, a depth $d_1$ of the first relief pattern 235 is set to 4.02 μm and a depth $d_2$ of the second relief pattern 236 is set to 7.03 μm. Then, the parameter α defined by a ratio of $d_2/d_1$ as shown in the equation (27) is equal to about 1.75. Outermost surfaces 321 and 322 of the diffractive optical element are formed to be flat and anti-reflecting coatings are applied on these outermost surfaces.

In the present embodiment, when diffraction efficiencies of ±1-order become maximum, the phase amplitude corresponding to the equation (26) may be expressed as follows:

$$a(\lambda) = \frac{m_0}{2} \cdot \frac{\{n_1(\lambda) - n_2(\lambda)\} + \alpha\{n_3(\lambda) - n_4(\lambda)\}}{\{n_1(\lambda_0) - n_2(\lambda_0)\} + \alpha\{n_3(\lambda_0) - n_4(\lambda_0)\}} \cdot \frac{\lambda_0}{\lambda} \quad (35)$$

Then, the diffraction efficiency of m-order ηm may be represented by the following equation (36):

$$\eta_m = \left\{ \frac{\sin(m\pi/2)}{m\pi/2} \cdot \cos\pi\left(a + \frac{m}{2}\right) \right\}^2 \quad (36)$$

The phase amplitude denoted by the equation (36) may be obtained by diving the right hand term in the equation (26) by two. This means that also in the present embodiment, the wavelength dependency of phase amplitude can be reduced by the same mechanism as that of the sixth embodiment.

Figure 35:
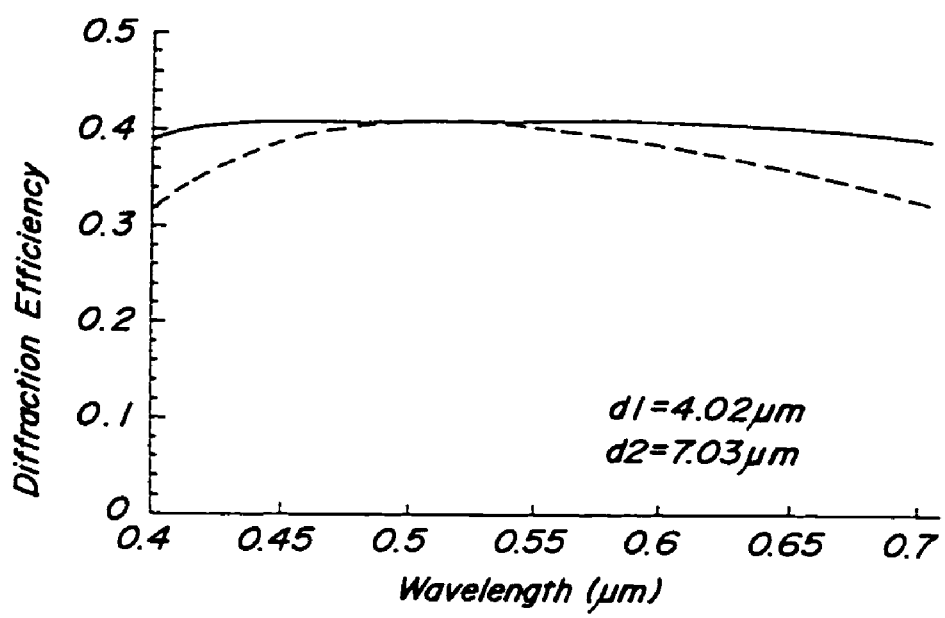
FIG. 35 is a graph representing wavelength dependencies of diffraction efficiency of the eighth embodiment and a known diffractive optical element.

FIG. 35 shows the wavelength dependency of diffraction efficiency of ±1-order in the diffractive lens of the present embodiment (solid curve) and a wavelength dependency of a known diffractive lens in which a rectangular phase grating is formed in a LAL14 substrate (broken curve). From the graph shown in FIG. 35, it is apparent that according to the invention, the wavelength dependency of diffraction efficiency is corrected very well as compared with the known diffractive optical element. The wavelength dependency of diffraction efficiency is corrected over a whole visible wavelength range, and thus the diffractive lens of the present embodiment is preferably used as a double-focus optical system for a visible wavelength range.

In the above explained six and seventh embodiments, the first and second relief patterns are formed to have the sawtooth cross sectional configuration, and in the eighth embodiment, the first and second relief patterns are shaped to have the rectangular cross sectional configuration, However, according to the invention, the cross sectional configuration of the first and second relief patterns is not restricted to these configurations, but any other configuration may be used.

FIG. 36 illustrates a ninth embodiment of the diffractive optical element according to the invention. the diffractive optical element of the present embodiment is formed as a transmission type diffractive lens. A first optical region 141 is made of an acrylic resin (nd=1.49, υd=57.7), and second and third optical regions 142 and 143 are made of a polycarbonate (nd=1.58, υd=30.5). These optical regions are stacked one on the other. In the present embodiment, a fourth optical region is constituted by the air surrounding the optical element. A first relief pattern 241 is formed in a boundary surface between the first and second optical regions 141 and 142, and a second relief pattern 242 is formed in a boundary surface between the third optical region 143 and the air, i.e. the fourth optical region. That is to say, the second relief pattern 242 is formed in a free surface of the third optical region 143. The first and second relief patterns 241 and 242 have an identical pitch distribution and are aligned in a direction of an optical axis in such a manner that top and bottom portions of the first relief pattern are aligned with bottom and top portions of the second relief pattern viewed in the direction of the optical axis. In the present embodiment, the top portions of the first relief pattern 241 are brought into contact with the bottom portions of the second relief pattern 242.

The pitch distribution of the first and second relief patterns 241 and 242 is optimized to have a given light collimating function and a depth of recesses of a sawtooth cross sectional configuration is optimized such that the diffraction efficiency of first-order becomes maximum at a wavelength of λ=550 nm. In the present embodiment, a depth $d_1$ of the first relief pattern 241 is 15.6 μm and a depth $d_2$ of the second relief pattern 242 is 3.34 μm. Therefore, the parameter α defined by a ratio of $d_2/d_1$ is equal to about 0.22.

In the present embodiment, the fourth optical region is formed by the atmosphere surrounding the optical element, practically the air having a refractive index of 1. Therefore, the wavelength dependency of diffraction efficiency can be corrected by the same function as the previous embodiments. Particularly, the fourth optical region has a very low refractive index, and thus a difference in refractive index between the third optical region 143 and the fourth optical region $\Delta n_2$ is sufficiently large. Then, a depth of the second relief pattern 242 can be relatively small. Therefore, the diffractive lens of the present invention can be thin, and the pitch of the relief patterns can be small.

In FIG. 37, a solid curve denotes the wavelength dependency of diffraction efficiency of the diffractive lens of the present embodiment and a broken curve shows a wavelength dependency of diffraction efficiency of a known diffractive lens in which a brazed pattern is formed in an acrylic resin substrate (optimizing wavelength $\lambda$=510 nm). From the graph shown in FIG. 37, it is apparent that also in the present embodiment, the wavelength dependency of diffraction efficiency is corrected efficiently as compared with the known diffractive lens.

FIG. 38 illustrates a tenth embodiment of the diffractive optical element according to the fourth aspect of the invention. The diffractive optical element of the present embodiment is formed as a transmission type diffractive lens. In the embodiments according to the fourth aspect of the invention shown in FIGS. 26, 30, 31, 34 and 36, the second and third optical regions are made of the same optical material. However, in the present embodiment, these optical regions are made different optical materials. A first optical region 151 is made of an LaL14 optical glass manufactured by OHARA (nd=1.6968, $\upsilon$d=55.5), a second optical region 152 is made of a polycarbonate (nd=1.58, $\upsilon$d=30.5), and a third optical region 153 is made of a UV curable resin (nd=1.52, $\upsilon$d=52). Further, the fourth optical region is constituted by the air surrounding the diffractive optical element. A first relief pattern 251 is formed in a boundary surface between the first and second optical regions 151 and 152, and a second relief pattern 252 is formed in a boundary surface between the third optical region 153 and the air, i.e. the fourth optical region. The first and second relief patterns 251 and 252 have an identical pitch distribution and are aligned in a direction of an optical axis in such a manner that top and bottom portions of the first relief pattern are aligned with bottom and top portions of the second relief pattern viewed in the direction of the optical axis. In the present embodiment, the top portions of the first relief pattern 251 are brought into contact with the bottom portions of the second relief pattern 252.

The pitch distribution of the first and second relief patterns 251 and 252 is optimized to have a given lens function and a depth of recesses of a sawtooth cross sectional configuration is optimized such that the diffraction efficiency of first-order becomes maximum at a wavelength of $\lambda$=550 nm. In the present embodiment, a depth $d_1$ of the first relief pattern 251 is −12.98 μm and a depth $d_2$ of the second relief pattern 252 is 1.82 μm. Therefore, the parameter $\alpha$ defined by a ratio of $d_2/d_1$ is equal to about −0.14.

Also in the present embodiment, a difference in refractive index between the first optical region 151 and the second optical region 152 $\Delta n_1$ and a difference in refractive index between the third optical region 153 and the air $\Delta n_2$ are given by the equations (23) and (24), respectively. Therefore, the wavelength dependency of diffraction efficiency can be corrected by the same function as the previous embodiments. That is to say, in the present embodiment, a sign of the parameter $\alpha$ is selected such that the phase shift functions of the first and second relief patterns 251 and 252 are mutually opposed, and thus a sign of $\Delta n_2$ whose absolute value decreases in accordance with an increase in wavelength is opposite to a sign of $\Delta n_1$. Therefore, a wavelength dependency of the term of the difference in refractive index $N(\lambda)$ is increased in accordance with an increase in wavelength. Then, $\lambda$ in the denominator of the equation (26) is well canceled by the term including the difference in refractive index. Therefore, the wavelength dependency of phase amplitude is decreased, and thus the wavelength dependency of diffraction efficiency is also decreased.

Moreover, in the present embodiment, the second and third optical regions 152 and 153 are made of different optical materials, and thus it is possible to set the differences in refractive index $\Delta n_1$ and $\Delta n_2$ suitable values independently from each other. Therefore, a suitable combination of the optical materials can be easily selected. Further, the fourth optical region is made of the air, the depth of the first and second relief patterns 251 and 252 can be thinner than that of the embodiment shown in FIG. 26, and thus it is possible to realize a thin type diffractive lens.

In FIG. 40, a solid curve denotes the wavelength dependency of diffraction efficiency of the diffractive lens of the present embodiment and a broken curve shows a wavelength dependency of diffraction efficiency of a known diffractive lens in which a brazed pattern is formed in a LaL14 glass substrate (optimizing wavelength $\lambda$=510 nm). From the graph shown in FIG. 40, it is apparent that also in the present embodiment, the wavelength dependency of diffraction efficiency is corrected very well upon compared with the known diffractive lens.

In the above explained sixth to tenth embodiments according to the fourth aspect of the invention, a distance between the first and second relief patterns d=$d_3$+$d_4$ is set to zero. However, according to the invention, the phase amplitude of the diffractive optical element is not basically dependent upon said distance as can be read from the equations (26) and (28).

FIG. 39 shows a modification of the tenth embodiment illustrated in FIG. 38. In the present embodiment, the second optical regions 152 and third optical region 153 are cemented to each other by means of an adhesive layer 160. Also in the present modified embodiment, the phase amplitudes are given by the equations (26) and (28), and therefore the wavelength dependency of diffraction efficiency can be decreased just like as the tenth embodiment.

It should be noted that the distance between the first and second relief patterns becomes important when a thickness of the diffractive optical element is taken into account. That is to say, it is preferable to select the distance d such that Q<1 is satisfied, wherein Q is the parameter defined by the equation (30). When this condition is satisfied, the diffractive optical element can be considered to be a thin type. In this case, the first and second relief patterns are considered to be substantially brought into contact with each other.

In the structure depicted in FIG. 39, a thickness of the adhesive layer 160 is $d_5$ and a refractive index of the adhesive layer is $n_5$, the depth D and average refractive index $n_0$' corresponding to the equations (31) and (32), respectively may be expressed as follows:

$$D = d_1 + d_2 + d_3 + d_4 + d_5 \quad (37)$$

$$n_0 = \frac{d_1 \frac{n_1 + n_2}{2} + d_2 \frac{n_3 + n_4}{2} + d_3 n_2 + d_4 n_3 + d_5 n_5}{d_1 + d_2 + d_3 + d_4 + d_5} \quad (38)$$

The depth D of the periodic structure may be expressed by a simple sum of thicknesses of the optical regions in which the first and second relief patterns are formed and the adhesive layer. Further, the average refractive index $n_0$' may be denoted by an average value of refractive indices of these regions.

As explained above in detail, according to the invention, by suitably selecting a ratio of the depth of the second relief pattern to the depth of the second relief pattern $\alpha(=d_2/d_1)$, the wavelength dependency of phase amplitude can be controlled independently from optical characteristics of optical materials such as substrate. Therefore, the wavelength dependency of diffraction efficiency can be optimized for respective applications, and a suitable combination of optical materials for reducing the wavelength dependency of diffraction efficiency can be easily found. In this manner, the diffractive optical element having the reduced wavelength dependency of diffraction efficiency can be realized at a low cost.

What is claimed is:

1. An image pick-up optical system comprising:
   a refractive type lens; and
   a diffractive optical element having a diffraction efficiency for a particular diffraction order more than 0.8 for a wavelength range from 0.4 µm to 0.7 µm, said diffractive optical element and refractive type lens being arranged along an optical axis of the image pick-up optical system.

2. The image pick-up optical system according to claim 1, wherein said diffractive optical element includes first, second and third optical regions which are arranged successively viewed in a direction of the optical axis, a first relief pattern formed in a first boundary surface between the first and second optical regions, and a second relief pattern formed in a second boundary surface between the second and third optical regions.

3. The image pick-up optical system according to claim 2, wherein a depth d1 of the first relief pattern and a depth d2 of the second relief pattern are smaller than 10 µm.

4. The image pick-up optical system according to claim 2, wherein a depth d1 of the first relief pattern is smaller than a depth d2 of the second relief pattern.

5. The image pick-up optical system according to claim 2, wherein an Abbe's number u1 of the first optical region is larger than an Abbe's number u3 of the third optical region.

6. The image pick-up optical system according to claim 2, wherein each of said first and second relief patterns has a rectangular cross sectional configuration having top and bottom portions.

7. The image pick-up optical system according to claim 6, wherein each of said first, second and third optical regions has a substantially constant refractive index.

8. The image pick-up optical system according to claim 7, wherein a refractive index n1 of the first optical region is different from a refractive index n3 of the third optical region and the refractive indices n1 and n3 are larger than a refractive index n2 of the second optical region.

9. The image pick-up optical system according to claim 6, wherein said first and second relief patterns have an identical pitch distribution and are arranged in a direction of the optical axis such that the top and bottom portions of the first relief pattern are aligned with the bottom and top portions of the second relief pattern, respectively.

10. The image pick-up optical system according to claim 9, wherein said first and second relief patterns are arranged such that a space is formed between the top portions of the first relief pattern and the bottom portions of the second relief pattern viewed in the direction of the optical axis.

11. The image pick-up optical system according to claim 9, wherein said first and second relief patterns are arranged such that the top portions of the first relief pattern are contacted with the bottom portions of the second relief pattern viewed in the direction of the optical axis.

12. An image pick-up optical system comprising:
    a refractive type lens; and
    a diffractive optical element having a diffraction efficiency more than 0.9 for a wavelength range from 0.4 µm to 0.7 µm, said diffractive optical element and refractive type lens being arranged along an optical axis of the image pick-up optical system, and said diffractive optical element includes first, second and third optical regions which are arranged successively viewed in a direction of the optical axis, a first relief pattern formed in a first boundary surface between the first and second optical regions, and a second relief pattern famed in a second boundary surface between the second and third optical regions, wherein each of said first and second relief patterns is constructed as a blazed grating.

13. The image pick-up optical system according to claim 12, wherein a surface of the first optical region opposed to the surface in which the first relief pattern is fanned is curved and a surface of the third optical region opposed to the surface in which the second relief pattern is formed is curved.

14. The image pick-up optical system according to claim 12, wherein each of said first and second relief patterns has a sawtooth cross sectional configuration including sharply raining sides and gently raising sides.

15. The image pick-up optical system according to claim 14, wherein said first and second relief patterns have an identical pitch distribution and are arranged in a direction of the optical axis such that top and bottom portions of the first relief pattern are aligned with top and bottom portions of the second relief pattern, respectively.

16. The image pick-up optical system according to claim 15, wherein said first and second relief patterns are arranged such that a space is formed between the top portions of the first relief pattern and the bottom portions of the second relief pattern viewed in the direction of the optical axis.

17. The image pick-up optical system according to claim 15, wherein said first and second relief patterns are arranged such that the top portions of the first relief pattern are contacted with the bottom portions of the second relief pattern viewed in the direction of the optical axis.

18. The image pick-up optical system according to claim 15, wherein said first and second relief patterns are arranged such that the top portions of the first relief pattern are extended up to points situating between the bottom portions and the top portions of the second relief pattern viewed in the direction of the optical axis.

19. The image pick-up optical system according to claim 14, wherein said first and second relief patterns have an identical pitch distribution and are aligned in a direction of the optical axis such that top and bottom portions of the first relief pattern are aligned with bottom and top portions of the second relief pattern, respectively.

20. The image pick-up optical system according to claim 19, wherein said first and second relief patterns are arranged such that a apace is formed between the top portions of the first relief pattern and the bottom portions of the second relief pattern viewed in the direction of the optical axis.

21. The image pick-up optical system according to claim 19, wherein said first and second relief patterns are arranged such that the top portions of the first relief pattern are contacted with the bottom portions of the second relief pattern viewed in the direction of the optical axis.

22. The image pick-up optical system according to claim 14, wherein each of said first, second and third optical regions has a substantially constant refractive index.

23. The image pick-up optical system according to claim 22, wherein a refractive index n1 of the first optical region is different from a refractive index n3 of the third optical region and the refractive indices n1 and n3 are larger than a refractive index n2 of the second optical region.

24. A camera comprising an image pick-up optical system according to any one of claims 1-11.

25. A camera comprising:
an image pick-up optical system for forming an image of an object to be picked-up; and
an image pick-up element receiving the image of the object and generating an image signal:
wherein said image pick-up optical system comprising:
a refractive type lens; and
a diffractive optical element having a diffraction efficiency for a particular diffraction order more than 0.8 for a wavelength range from 0.4 μm to 0.7 μm, said diffractive optical element and refractive type lens being arranged along an optical axis of the image pick-up optical system.

26. The camera according to claim 25, wherein said diffractive optical element includes first, second and third optical regions which are arranged successively viewed in a direction of the optical axis, a first relief pattern formed in a first boundary surface between the first and second optical regions, and a second relief pattern formed in a second boundary surface between the second and third optical regions.

27. The camera according to claim 26, wherein a depth d1 of the first relief pattern and a depth d2 of the second relief pattern are smaller than 10 μm.

28. The camera according to claim 26, wherein a depth d1 of the first relief pattern is smaller than a depth d2 of the second relief pattern.

29. The camera according to claim 26, wherein an Abbe's number u1 of the first optical region is larger than an Abbe's number u3 of the third optical region.

30. The camera according to claim 26, wherein each of said first and second relief patterns has a rectangular cross sectional configuration having top and bottom portions.

31. The camera according to claim 30, wherein each of said first, second and third optical regions has a substantially constant refractive index.

32. The camera according to claim 31, wherein a refractive index n1 of the first optical region is different from a refractive index n3 of the third optical region and the refractive indices n1 and n3 are larger than a refractive index n2 of the second optical region.

33. The camera according to claim 30, wherein said first and second relief patterns have an identical pitch distribution and are arranged in a direction of the optical axis such that the top and bottom portions of the first relief pattern are aligned with the bottom and top portions of the second relief pattern, respectively.

34. The camera according to claim 33, wherein said first and second relief patterns are arranged such that a space is formed between the top portions of the first relief pattern and the bottom portions of the second relief pattern viewed in the direction of the optical axis.

35. The camera according to claim 33, wherein said first and second relief patterns are arranged such that the top portions of the first relief pattern are contacted with the bottom portions of the second relief pattern viewed in the direction of the optical axis.

36. A camera comprising:
an image pick-up optical system for forming an image of an object to be picked-up; and
an image pick-up element receiving the image of the object and generating an image signal:
wherein said image pick-up optical system comprising:
a refractive type lens; and
a diffractive optical element having a diffraction efficiency more than 0.8 for a wavelength range from 0.4 μm to 0.7 μm, said diffractive optical element and refractive type lens being arranged along an optical axis of the image pick-up optical system, and said diffractive optical element includes first, second and third optical regions which are arranged successively viewed in a direction of the optical axis, a first relief pattern formed in a first boundary surface between the first and second optical regions, and a second relief pattern formed in a second boundary surface between the second and third optical regions, and each of said first and second relief patterns is constructed as a blazed grating.

37. The camera according to claim 36, wherein a surface of the first optical region opposed to the surface in which the first relief pattern is formed is curved and a surface of the third optical region opposed to the surface in which the second relief pattern is formed is curved.

38. The camera according to claim 36, wherein each of said first and second relief patterns has a sawtooth cross sectional configuration including sharply raising sides and gently raising sides.

39. The camera according to claim 38, wherein each of said first, second and third optical regions has a substantially constant refractive index.

40. The camera according to claim 39, wherein a refractive index n1 of the first optical region is different from a refractive index n3 of the third optical region and the refractive indices n1 and n3 are larger than a refractive index n2 of the second optical region.

41. The camera according to claim 38, wherein said first and second relief patterns have an identical pitch distribution and are arranged in a direction of the optical axis such that top and bottom portions of the first relief pattern are aligned with top and bottom portions of the second relief pattern, respectively.

42. The camera according to claim 41, wherein said first and second relief patterns are arranged such that a apace is formed between the top portions of the first relief pattern and the bottom portions of the second relief pattern viewed in the direction of the optical axis.

43. The camera according to claim 41, wherein said first and second relief patterns are arranged such that the top portions of the first relief pattern are contacted with the bottom portions of the second relief pattern viewed in the direction of the optical axis.

44. The camera according to claim 41, wherein said first and second relief patterns are arranged such that the top portions of the first relief pattern are extended up to points situating between the bottom portions and the top portions of the second relief pattern viewed in the direction of the optical axis.

45. The camera according to claim 38, wherein said first and second relief patterns have an identical pitch distribution and are aligned in a direction of the optical axis such that top and bottom portions of the first relief pattern are aligned with bottom and top portions of the second relief pattern, respectively.

46. The camera according to claim 45, wherein said first and second relief patterns are arranged such that a space is formed between the top portions of the first relief pattern and the bottom portions of the second relief pattern viewed in the direction of the optical axis.

47. The camera according to claim 45, wherein said first and second relief patterns are arranged such that the top portions of the first relief pattern are contacted with the bottom portions of the second relief pattern viewed in the direction of the optical axis.

48. A view finder of a camera comprising:
a refractive type lens; and
a diffractive optical element having a diffraction efficiency for a particular diffraction order more than 0.8 for a wavelength range from 0.4 μm to 0.7 μm, said diffractive optical element and refractive type lens being arranged along an optical axis of the view finder.

49. The view finder according to claim 48, wherein said diffractive optical element includes first, second and third optical regions which are arranged successively viewed in a direction of the optical axis, a first relief pattern formed in a first boundary surface between the first and second optical regions, and a second relief pattern formed in a second boundary surface between the second and third optical regions.

50. The view finder according to claim 49, wherein a depth d1 of the first relief pattern and a depth d2 of the second relief pattern are smaller than 10 μm.

51. The view finder according to claim 49, wherein a depth d1 of the first relief pattern is smaller than a depth d2 of the second relief pattern.

52. The view finder according to claim 49, wherein an Abbe's number u1 of the first optical region is larger than are Abbe's number u3 of the third optical region.

53. The view finder according to claim 49, wherein each of said first and second relief patterns is constructed as a blazed grating.

54. The view finder according to claim 53, wherein each of said first and second relief patterns has a sawtooth cross Sectional configuration including sharply raising sides and gently raising sides.

55. The view finder according to claim 54, wherein each of said first, second and third optical regions has a substantially constant refractive index.

56. The view finder according to claim 55, wherein a refractive index n1 of the first optical region is different from a refractive index n3 of the third optical region and the refractive indices n1 and n3 are larger than a refractive index n2 of the second optical region.

57. The view finder according to claim 54, wherein said first and second relief patterns have an identical pitch distribution and are arranged in a direction of the optical axis such that top and bottom portions of the first relief pattern are aligned with top and bottom portions of the second relief pattern, respectively.

58. The view finder according to claim 57, wherein said first and second relief patterns are arranged such that a space is formed between the top portions of the first relief pattern and the bottom portions of the second relief pattern viewed in the direction of the optical axis.

59. The view finder according to claim 57, wherein said first and second relief patterns are arranged such that the top portions of the first relief pattern are contacted with the bottom portions of the second relief pattern viewed in the direction of the optical axis.

60. The view finder according to claim 57, wherein said first and second relief patterns are arranged such that the top portions of the first relief pattern are extended up to points situating between the bottom portions and the top portions of the second relief pattern viewed in the direction of the optical axis.

61. The view finder according to claim 54, wherein said first and second relief patterns have an identical pitch distribution and are aligned in a direction of the optical axis such that top and bottom portions of the first relief pattern are aligned with bottom and top portions of the second relief pattern, respectively.

62. The view finder according to claim 61, wherein said first and second relief patterns are arranged such that a space is formed between the top portions of the first relief pattern and the bottom portions of the second relief pattern viewed in the direction of the optical axis.

63. The view finder according to claim 61, wherein said first and second relief patterns are arranged such that the top portions of the first relief pattern are contacted with the bottom portions of the second relief pattern viewed in the direction of the optical axis.

64. The view finder according to claim 53, wherein a surface of the first optical region opposed to the surface in which the first relief pattern is formed is curved and a surface of the third optical region opposed to the surface in which the second relief pattern is formed is curved.

65. The view finder according to claim 49, wherein each of said first and second relief patterns has a rectangular cross sectional configuration having top and bottom portions.

66. The view finder according to claim 65, wherein each of said first, second and third optical regions has a substantially constant refractive index.

67. The view finder according to claim 66, wherein a refractive index n1 of the first optical region is different from a refractive index n3 of the third optical region and the refractive indices n1 and n3 are larger than a refractive index n2 of the second optical region.

68. The view finder according to claim 65, wherein said first and second relief patterns have an identical pitch distribution and are arranged in a direction of the optical axis such that the top and bottom portions of the first relief pattern are aligned with the bottom and top portions of the second relief pattern, respectively.

69. The view finder according to claim 68, wherein said first and second relief patterns are arranged such that a space is formed between the top portions of the first relief pattern and the bottom portions of the second relief pattern viewed in the direction of the optical axis.

70. The view finder according to claim 68, wherein said first and second relief patterns are arranged such that the top portions of the first relief pattern are contacted with the bottom portions of the second relief pattern viewed in the direction of the optical axis.

71. An image pick-up optical system comprising:
a refractive type lens; and
two diffractive optical surfaces, said diffractive optical surfaces and refractive type lens being arranged along an optical axis of the image pick-up optical system and said diffractive optical surfaces being arranged successively viewed in a direction of the optical axis; wherein each of the diffractive optical surfaces is formed as a relief pattern having a sawtooth cross sectional configuration including sharply raising sides and gently raising sides and said diffractive optical surfaces having a diffraction efficiency more than 0.8 for a wavelength range from 0.4 μm to 0.7 μm.

72. The image pick-up optical system according to claim 71, wherein said two diffractive optical surfaces are fanned by a first relief pattern and a second relief pattern, and a depth d1 of the first relief pattern and a depth d2 of the second relief pattern are smaller than 10 µm.

73. The image pick-up optical system according to claim 71, wherein said two diffractive optical surfaces are formed by a first relief pattern and a second relief pattern, and a depth d1 of the first relief pattern is smaller than a depth d2 of the second relief pattern.

74. The image pick-up optical system according to claim 71, wherein said two diffractive optical surfaces are formed by a first relief pattern and a second relief pattern, and said first and second relief patterns have an identical pitch distribution and are arranged in a direction of the optical axis such that top and bottom portions of the first relief pattern are aligned with top and bottom portions of the second relief pattern, respectively.

75. The image pick-up optical system according to claim 74, wherein said two diffractive optical surfaces are formed by a first relief pattern and a second relief pattern, and said first and second relief patterns are arranged such that the top portions of the first relief pattern are contacted with the bottom portions of the second relief pattern viewed in the direction of the optical axis.

76. The image pick-up optical system according to claim 71, wherein said two diffractive optical surfaces are formed by a first relief pattern and a second relief pattern, and said first and second relief patterns are arranged such that a space is formed between the top portions of the first relief pattern and the bottom portions of the second relief pattern viewed in the direction of the optical axis.

77. The image pick-up optical system according to claim 71, wherein said two diffractive optical surfaces are formed by a first relief pattern and a second relief pattern, and said first and second relief patterns are arranged such that the top portions of the first relief pattern are extended up to points situating between the bottom portions and the top portions of the second relief pattern viewed in the direction of the optical axis.

78. The image pick-up optical system according to claim 71, wherein said two diffractive optical surfaces are formed by a first relief pattern and a second relief pattern, and said first and second relief patterns have an identical pitch distribution and are aligned in a direction of the optical axis such that top and bottom portions of the first relief pattern are aligned with bottom and top portions of the second relief pattern, respectively.

79. The image pick-up optical system according to claim 78, wherein said two diffractive optical surfaces are formed by a first relief pattern and a second relief pattern, and said first and second relief patterns are arranged such that the top portions of the first relief pattern are contacted with the bottom portions of the second relief pattern viewed in the direction of the optical axis.

80. The image pick-up optical system according to claim 71 comprising a non-diffractive optical surface arranged between the two diffractive optical surfaces.

81. The image pick-up optical system according to claim 80, wherein said two diffractive optical surfaces are formed by a first relief pattern and a second relief pattern, and a depth d1 of the first relief pattern and a depth d2 of the second relief pattern are smaller than 10 µm.

82. The image pick-up optical system according to claim 80, wherein said two diffractive optical surfaces are formed by a first relief pattern and a second relief pattern, and a depth d1 of the first relief pattern is smaller than a depth d2 of the second relief pattern.

83. The image pick-up optical system according to claim 80, wherein said two diffractive optical surfaces are formed by a first relief pattern and a second relief pattern, and each of said first and second relief patterns is constructed as a blazed grating.

84. The image pick-up optical system according to claim 80, wherein said two diffractive optical surfaces are formed by a first relief pattern and a second relief pattern, and said first and second relief patterns have an identical pitch distribution and are arranged in a direction of the optical axis such that top and bottom portions of the first relief pattern are aligned with top and bottom portions of the second relief pattern, respectively.

85. The image pick-up optical system according to claim 84, wherein said first and second relief patterns are arranged such that a space is formed between the top portions of the first relief pattern and the bottom portions of the second relief pattern viewed in the direction of the optical axis.

86. The image pick-up optical system according to claim 84, wherein said first and second relief patterns are arranged such that the top portions of the first relief pattern are contacted with the bottom portions of the second relief pattern viewed in the direction of the optical axis.

87. The image pick-up optical system according to claim 80, wherein said two diffractive optical surfaces are formed by a first relief pattern and a second relief pattern, and said first and second relief patterns have an identical pitch distribution and are aligned in a direction of the optical axis such that top and bottom portions of the first relief pattern are aligned with bottom and top portions of the second relief pattern, respectively.

88. The image pick-up optical system according to claim 87, wherein said first and second relief patterns are arranged such that the top portions of the first relief pattern are contacted with the bottom portions of the second relief pattern viewed in the direction of the optical axis.

89. The image pick-up optical system according to claim 87, wherein a refractive index of an optical material situating between said non-diffractive optical surface and said second relief pattern is lower than a refractive index of an optical material situating on a that side of said second relief pattern, which is opposite to said non-diffractive optical surface.

90. The image pick-up optical system according to claim 87, wherein said first relief pattern is formed on one surface of a first thin layer the other surface of which is curved, and said second relief pattern is formed on one surface of a second thin layer, the other surface of which is curved in a same direction in which said other surface of said first thin layer is curved.

91. The image pick-up optical system according to claim 80, wherein said two diffractive optical surfaces are formed by a first relief pattern and a second relief pattern, and a refractive index of a first optical material situating between said non-diffractive optical surface and said second relief pattern is lower than a refractive index of a second optical material situating on that side of said second relief pattern, which is opposite to said non-diffractive optical surface.

92. The image pick-up optical system according to claim 80, wherein said two diffractive optical surfaces are formed by a first relief pattern and a second relief pattern, said first relief pattern is formed on one surface of a first thin layer the other surface of which is curved, and said second relief pattern is formed on one surface of a second thin layer the other surface of which is curved in a same direction in which said other surface of said first thin layer is curved.

93. An image pick-up optical system comprising:
a refractive type lens; and
two diffractive optical surfaces, said diffractive optical surfaces and refractive type lens being arranged along an optical axis of the image pick-up optical system and said diffractive optical surfaces being arranged successively viewed in a direction of the optical axis; wherein
each of the diffractive optical surfaces is formed as a relief pattern having a sawtooth cross sectional configuration including sharply raising sides and gently raising sides and said diffractive optical surfaces having a diffraction efficiency more than 0.8 for a wavelength range from 0.4 µm to 0.7 µm; wherein
said two diffractive optical surfaces are formed by a first relief pattern and a second relief pattern, and each of said first and second relief patterns is constructed as a blazed grating.

* * * * *